United States Patent
Tanaka et al.

(10) Patent No.: US 8,298,707 B2
(45) Date of Patent: Oct. 30, 2012

(54) POSITIVE ACTIVE MATERIAL AND NONAQUEOUS ELECTROLYTE SECONDARY BATTERY

(75) Inventors: Takehiko Tanaka, Fukushima (JP); Yosuke Hosoya, Fukushima (JP); Yoshikatsu Yamamoto, Fukushima (JP); Kiyohiko Suzuki, Fukushima (JP); Keizo Koga, Fukushima (JP)

(73) Assignee: Sony Corporation, Tokyo (JP)

( * ) Notice: Subject to any disclaimer, the term of this patent is extended or adjusted under 35 U.S.C. 154(b) by 2012 days.

(21) Appl. No.: 11/300,081

(22) Filed: Dec. 14, 2005

(65) Prior Publication Data

US 2006/0093914 A1 May 4, 2006

Related U.S. Application Data

(62) Division of application No. 10/204,952, filed as application No. PCT/JP01/11303 on Dec. 21, 2001, now abandoned.

(30) Foreign Application Priority Data

Dec. 28, 2000 (JP) ............................... P2000-403455
Dec. 28, 2000 (JP) ............................... P2000-403460
Dec. 28, 2000 (JP) ............................... P2000-403463

(51) Int. Cl.
*H01M 4/48* (2010.01)
*H01M 4/52* (2010.01)

(52) U.S. Cl. ................... 429/231.1; 429/231.3; 429/223; 429/221; 429/220; 429/231.5; 429/231.6; 429/229

(58) Field of Classification Search .................. None
See application file for complete search history.

(56) References Cited

U.S. PATENT DOCUMENTS

| 5,478,675 | A |   | 12/1995 | Nagaura |   |
|---|---|---|---|---|---|
| 5,514,496 | A | * | 5/1996 | Mishima et al. | 429/338 |
| 6,303,250 | B1 | * | 10/2001 | Watanabe et al. | 429/306 |
| 7,014,954 | B2 | * | 3/2006 | Yamaguchi et al. | 429/330 |
| 7,045,251 | B2 | * | 5/2006 | Tsujimoto et al. | 429/223 |
| 2003/0108790 | A1 | * | 6/2003 | Manthiram et al. | 429/218.1 |

FOREIGN PATENT DOCUMENTS

| EP | 0573998 | 12/1993 |
| JP | 5-343043 | 12/1993 |

(Continued)

*Primary Examiner* — Raymond Alejandro
*Assistant Examiner* — Angela Martin
(74) *Attorney, Agent, or Firm* — SNR Denton US LLP

(57) ABSTRACT

A positive active material including a compound expressed by a general formula $Li_mM_xM'_yM''_zO_2$ (here, M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M'' designates at least one kind of element selected from Mg, Ca, B and Ga. Further, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$) and lithium manganese oxide expressed by a general formula $Li_sMn_{2-t}Ma_tO_4$ (here, the value of s is expressed by $0.9 \leq s$, the value of t is located within a range expressed by $0.01 \leq t \leq 0.5$, and Ma indicates one or a plurality of elements between Fe, Co, Ni, Cu, Zn, Al, Sn, Cr, V, Ti, Mg, Ca, Sr, B, Ga, In, Si and Ge) are included, so that both a large capacity and the suppression of the rise of temperature of a battery upon overcharging operation are achieved.

20 Claims, 1 Drawing Sheet

| | FOREIGN PATENT DOCUMENTS | |
|---|---|---|
| JP | 07-235291 | 9/1995 |
| JP | 10-092429 | 4/1998 |
| JP | 10-125323 | 5/1998 |
| JP | 10-321227 | 12/1998 |
| JP | 11-086845 * | 3/1999 |
| JP | 11-288716 | 10/1999 |
| JP | 2000-015108 | 1/2000 |
| JP | 2000-021391 | 1/2000 |
| JP | 2000-077072 | 3/2000 |
| JP | 2000-090982 | 3/2000 |
| JP | 2000-195522 | 7/2000 |
| JP | 2000-195550 | 7/2000 |
| JP | 2000-235868 | 8/2000 |
| JP | 2000-251892 | 9/2000 |
| JP | 2000-315503 | 11/2000 |
| JP | 2000-327339 | 11/2000 |
| JP | 2001-135314 * | 5/2001 |
| JP | 2001-319652 | 11/2001 |
| JP | 2001-357851 | 12/2001 |

* cited by examiner

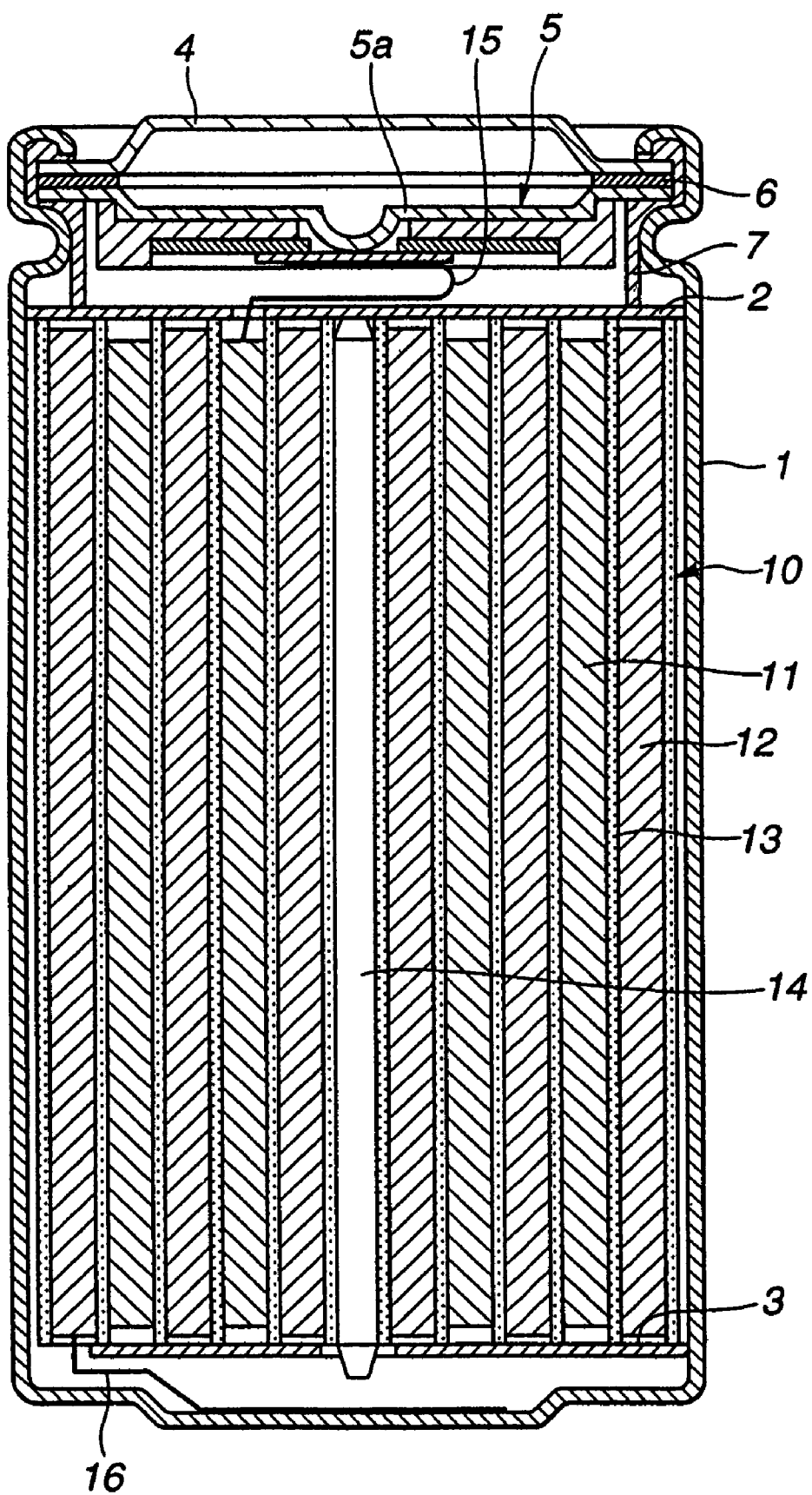

POSITIVE ACTIVE MATERIAL AND NONAQUEOUS ELECTROLYTE SECONDARY BATTERY

CROSS REFERENCE TO RELATED APPLICATIONS

This is a divisional of co-pending application Ser. No. 10/204,952, filed Oct. 25, 2002, which claims priority to PCT Application No. JP01/11303, filed Dec. 21, 2001, which claims priority to Japanese Patent Application Nos. P2000-403455, P2000-403460 and P2000-403463, each of which was filed Dec. 28, 2000. Each of the above references is incorporated herein by reference in its entirety.

TECHNICAL FIELD

The present invention relates to a positive active material capable of being reversibly doped with and dedoped from lithium and a nonaqueous electrolyte secondary battery using this positive active material.

BACKGROUND OF THE INVENTION

In recent years, with the development of various kinds of compact and cordless electronic devices, it has been demanded for secondary batteries as power sources for driving them to have high capacity and decrease weight. As representative secondary batteries, there are well-known lead-acid batteries, alkaline storage batteries, lithium secondary batteries, etc. Since the lithium secondary batteries which are nonaqueous electrolyte secondary batteries utilizing a lithium ion doping and dedoping action can realize the high capacity especially among the above-described secondary batteries, they have been examined in various aspects.

For instance, for a lithium-ion secondary battery of the nonaqueous electrolyte secondary battery which can realize the demands of the secondary battery capable of having high capacity, low weight and high energy density and excellent in its charging and discharging cyclic characteristics, it has been desired to realize a practical secondary battery with a battery structure in which a battery performance is scarcely deteriorated even when the battery is used for a long time, and which employs stable electrodes and an electrode composite mixture and an electrode active material and a positive active material composite mixture hardly deteriorated even upon use under a condition of high temperature or for a change in the battery upon abnormality of the battery.

In case the above-described nonaqueous electrolyte battery has a sealed type structure, when the electric current of a prescribed quantity of electricity or more is supplied upon charging due to any cause so that the nonaqueous electrolyte battery is overcharged, battery voltage will rise and electrolyte solution or the like will be decomposed to generate gas so that the internal pressure of the battery will rise. When this overcharged state is continued, an abnormal reaction that the electrolyte or the active materials are rapidly decomposed is generated and the temperature of the battery abruptly rises.

As a measure for suppressing such a rise of the temperature of the battery, there is proposed an explosion-proof type sealed battery having a current cut-off means which operates in accordance with the rise of the internal pressure of the battery. In such an explosion-proof closed type battery, for instance, when an overcharged state advances to generate gas due to the chemical change of the inner part of the battery so that the internal pressure of the battery rises to a prescribed threshold value or higher, the current cut-off means operates in accordance with the rise of the internal pressure to cut off charging current so as to suppress the rapid rise of the temperature of the battery.

As described above, in order to operate the current cut-off means, the internal pressure of the threshold value or higher is required. However, in the nonaqueous electrolyte secondary battery, the decomposition of the electrolyte or the active materials may advance to generate heat which leads to the quick rise of temperature so that the current cut-off means may not effectively operate, before the internal pressure of the battery rises to reach the threshold value.

Thus, in order to assuredly operate the current cut-off means, there is put into practical use a method for including lithium carbonate of 0.5 wt % to 15 wt % in lithium composite oxide such as $LiCoO_2$ serving as a positive active material as disclosed in Japanese Patent Application Laid-Open No. hei. 4-328278. According to this method, carbon dioxide gas generated when lithium carbonate is electrochemically decomposed serves to suppress an abnormal reaction during an overcharging operation. Further, since the battery is filled with not only gas generated as a result of the decomposition of electrolyte solution, but also carbon dioxide gas generated from lithium carbonate, the current cut-off means can be assuredly operated in an early stage and the rise of temperature of the battery can be advantageously assuredly suppressed.

However, when lithium carbonate is included in a cathode in order to obtain an assured suppressing effect for the rise of temperature of the battery, as described above, a battery capacity has been inconveniently deteriorated.

Further, for example, in a conventional nonaqueous electrolyte battery as disclosed in Japanese Patent Application Laid-Open No. hei. 8-45498, there has been a problem that charging and discharging cyclic characteristics cannot be sufficiently improved depending on the particle diameter of the lithium manganese oxide and lithium nickel oxide. Further, in the nonaqueous electrolyte battery, since battery characteristics such as an initial capacity are deteriorated depending on the selection of an negative active material, especially, a larger deterioration is generated upon storage of the battery, there is left room for improvement of the battery characteristics.

Still further, in the nonaqueous electrolyte battery, especially when $LiNiO_2$ is employed as the positive active material, an expansion and contraction are generated upon charging and discharging operations like graphite or other alloys used as the negative active material. Thus, the volume change of the positive active material is generated, and accordingly, there inconveniently arises a phenomenon that a composite mixture layer including the active materials is peeled off or electrodes are deformed as charging and discharging cycles advance to deteriorate the cyclic characteristics.

SUMMARY OF THE INVENTION

It is an object of the present invention to solve the problems of the conventional positive active material and to provide a positive active material used for cathode and a nonaqueous electrolyte secondary battery which can realize an excellent electrode performance and a nonaqueous electrolyte secondary battery performance without including an addition material which does not contribute to charging and discharging reactions and in which an excellent charging and discharging cyclic performance and a storage performance with a large capacity may be compatible with the suppression of the rise of temperature of the battery upon overcharging. Further, it is another object of the present invention to propose a new positive active material utilizing the mixture obtained by mixing composite oxides of lithium and transition metals and a new battery element structure upon using the positive active material and to provide a nonaqueous electrolyte secondary battery with a large capacity which can maintain a stable structure and is excellent in its cyclic characteristics.

The positive active material according to the present invention includes a compound expressed by a general formula $Li_mM_xM'_yM''_zO_2$ (here, M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M" designates at least one kind of element selected from Mg, Ca, B and Ga. Further, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$).

Since such a positive active material includes the compound expressed by the general formula $Li_mM_xM'_yM''_zO_2$, the structural stability of the positive active material is maintained even in an overcharged state. The positive active material especially preferably includes a compound expressed by a general formula $Li_mCo_xM'_yM''_zO_2$ in which M is replaced by Co (here, M' designates at least one kind of element selected from Al, Cr, V, Mn and Fe. B designates at least one kind of element selected from Mg and Ca. Further, x is designated by an expression of $0.9 \leq x < 1$, y is indicated by an expression of $0.001 \leq y \leq 0.5$, z is indicated by an expression of $0.001 \leq z \leq 0.05$, and m is indicated by an expression of $0.5 \leq m \leq 1$).

Further, a nonaqueous electrolyte secondary battery according to the present invention comprises: a cathode including a positive active material; an anode including a negative active material and a nonaqueous electrolyte, wherein the positive active material includes a compound expressed by a general formula $Li_mM_xM'_yM''_zO_2$ (here, M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M" designates at least one kind of element selected from Mg, Ca, B and Ga. Further, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$).

Since such a nonaqueous electrolyte secondary battery includes the compound expressed by the general formula $Li_mM_xM'_yM''_zO_2$, the structural stability of the positive active material is maintained and the rise of temperature of the battery is suppressed even in an overcharged state. Here, the positive active material specially preferably includes a compound expressed by a general formula $Li_mCo_xM'_yM''_zO_2$ in which M is replaced by Co (here, M' designates at least one kind of element selected from Al, Cr, V, Mn and Fe. M" designates at least one kind of element selected from Mg and Ca. Further, x is designated by an expression of $0.9 \leq x < 1$, y is indicated by an expression of $0.001 \leq y \leq 0.05$, z is indicated by an expression of $0.001 \leq z \leq 0.05$, and m is indicated by an expression of $0.5 \leq m \leq 1$).

Further, in the nonaqueous electrolyte secondary battery, the anode preferably includes as negative materials at least one or more kinds of materials between lithium metals, lithium alloys, or materials capable of being doped with or dedoped from lithium. Still further, the materials capable of being doped with or dedoped from lithium are desirably carbonaceous materials or materials capable of forming alloys with lithium.

Still further, the anode and the cathode may be formed in the configurations of spiral type electrode bodies and include a current cut-off means operating in accordance with the rise of internal pressure in the battery.

In addition, in the nonaqueous electrolyte secondary battery according to the present invention, the positive active material may further include lithium manganese oxide expressed by a general formula $Li_sMn_{2-t}Ma_tO_4$ (here, the value of s is designated by an expression of $0.9 \leq s$, the value of t is located within a range expressed by $0.01 \leq t \leq 0.5$ and Ma includes one or a plurality of elements between Fe, Co, Ni, Cu, Zn, Al, Sn, Cr, V, Ti, Mg, Ca, Sr, B, Ga, In, Si and Ge.)

Further, in the nonaqueous electrolyte secondary battery according to the present invention, the positive active material preferably includes manganese-containing oxides having at least one kind of first element selected from a group having lithium, manganese, metal elements except manganese and boron and oxygen, the mole ratio of the first element relative to the manganese (first element/manganese) being located within a range of 0.01/1.99 or more and 0.5/1.5 or less, and nickel-containing oxides including at least one kind of second element selected from a group having lithium, nickel and metal elements except nickel and boron and oxygen, the mole ratio of the second element relative to the nickel (second element/nickel) being located within a range of 0.01/0.99 or more and 0.5/0.5 or less, the average specific surface area of the positive active material is preferably 0.2 $m^2/g$ or larger and 1.5 $m^2/g$ or smaller and the amount of $Li_2CO_3$ remaining in the positive active material is preferably 5.0 wt % or lower relative to all the weight of the positive active material.

Additionally, in the nonaqueous electrolyte secondary battery according to the present invention, the positive active material preferably includes manganese-containing oxides having at least one kind of first element selected from a group having lithium, manganese, metal elements except manganese and boron and oxygen the mole ratio of the first element relative to the manganese (first element/manganese) being located within a range of 0.01/1.99 or more and 0.5/1.5 or less, and nickel-containing oxides including at least one kind of second element selected from a group having lithium, nickel and metal elements except nickel and boron and oxygen, the mole ratio of the second element relative to the nickel (second element/nickel) being located within a range of 0.01/0.99 or more and 0.5/0.5 or less, the negative active material preferably includes at least one or more kinds of materials between lithium metals, lithium alloys, or materials capable of being doped with or dedoped from lithium and the average specific surface area of the negative active material is preferably 0.5 $m^2/g$ or more and 10 $m^2/g$ or less.

BRIEF DESCRIPTION OF THE DRAWING

FIG. 1 is a longitudinally sectional view of a nonaqueous electrolyte secondary battery showing an embodiment of the present invention.

DETAILED DESCRIPTION OF THE PRESENTLY PREFERRED EMBODIMENTS

Now, referring to the drawing, a nonaqueous electrolyte secondary battery to which the present invention is applied will be described below. Firstly, the sectional structure of the nonaqueous electrolyte secondary battery as a first embodiment of the present invention is shown in FIG. 1. This nonaqueous electrolyte secondary battery is a so-called cylindrical battery and has a spirally coiled electrode body 10 in which an elongated cathode 11 and an elongated anode 12 are coiled through a separator 13 in a substantially hollow and cylindrical battery can 1. The battery can 1 is composed of, for instance, iron (Fe) plated with nickel and has one end part closed and the other end part opened. In the battery can 1, a pair of insulating plates 2 and 3 are respectively arranged perpendicularly to the peripheral surface of the coiled body so as to sandwich the spirally coiled electrode body 10 in therebetween.

To the open end part of the battery can 1, a battery cover 4, a current cut-off means 5 and a positive temperature coefficient element (PTC element) 6 provided inside the battery cover 4 are attached by caulking them through a gasket 7. The inner part of the battery can 1 is sealed. The battery cover 4 is composed of, for instance, the same material as that of the battery can 1. The current cut-off means 5 is electrically connected to the battery cover 4 through the positive temperature coefficient element 6, so that when the internal pressure of the battery reaches a prescribed value or higher due to an internal short-circuit or external heating, a disc plate 5a is inverted to disconnect the electrical connection of the battery cover 4 and the spirally coiled electrode body 10. The positive temperature coefficient element 6 serves to restrict a current in accordance with the increase of a resistance value when temperature rises and to prevent an abnormal heat generation due to large current. The positive temperature coefficient element 6 is composed of, for instance, barium titanate semiconductor ceramics. The gasket 7 is made of, for example, an insulating material and asphalt is applied to the surface thereof.

The spirally coiled electrode body 10 is coiled about, for instance, a center pin 14. To the cathode 11 of the spirally coiled electrode body 10, a cathode lead 15 made of aluminum (Al) or the like is connected. To the anode 12, an anode lead 16 made of nickel or the like is connected. The cathode lead 15 is welded to the current cut-off means 5 to be electrically connected to the battery cover 4. The anode lead 16 is welded and electrically connected to the battery can 1.

The anode 12 has, for instance, a structure similar to that of the cathode 11 that anode composite mixture layers are respectively provided on both the surfaces or one surface of an anode current collector layer. The anode current collector layer is made of a metallic foil such as a copper foil, a nickel foil or a stainless steel foil. The anode composite mixture layer includes one kind or two or more kinds of negative materials capable of absorbing and desorbing, that is, being doped with or dedoped from, for instance, lithium metals or lithium, under a potential of 2V or lower by considering a lithium metal potential to be a reference, and may further include a binding agent such as polyvinylidene fluoride as required.

As the negative materials capable of being doped with and dedoped from lithium, there may be exemplified lithiummetals and lithium alloy compounds. The lithium alloy compound described above designates a compound expressed by a chemical formula $D_k E_l Li_m$. In this chemical formula, D designates at least one kind of metal elements and semiconductor elements capable of forming lithium alloys or lithium compounds. E designates at least one kind of metal elements and semiconductor elements except lithium and D. Further, the values of k, l and m are respectively expressed by $k>0$, $1 \geq 0$ and $m \geq 0$.

As the metal elements or the semiconductor elements capable of forming the lithium alloys or the lithium compounds, the metal elements or the semiconductor elements belonging to a group of 4B are preferable, silicon and tin are especially preferable, and silicon is most preferable. As the metals or the semiconductor elements capable of forming the lithium alloys or the lithium compounds, there may be enumerated each metal of Mg, B, Al, Ga, In, Si, Ge, Sn, Pb, Sb, Bi, Cd, Ag, Zn, Hf, Zr and Y and alloys and compounds of them, for instance, Li—Al, Li—Al—M (in the formula, M is composed of one or more elements of 2A, 3B, 4B and transition metal elements.), AlSb, CuMgSb, etc.

Further, in the present invention, the semiconductor elements such as B, Si, As, etc. are also included in the metal elements. The alloys or the compounds of these elements are also preferable. For example, there may be exemplified $M_x Si$ (in the formula, M designates one or more metal elements except Si and the value of x is expressed by $0<x$.) or $M_x Sn$ (in the formula, M designates one or more metal elements except Sn and the value of x is expressed by $0<x$.).

More specifically, there may be enumerated $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, etc.

Further, as the negative materials, there may be employed the elements capable of forming alloys or compounds by using lithium as mentioned above, or the compounds capable of forming alloys or compounds by using lithium. That is, one or more kinds of elements belonging to the group of 4B may be included in the anode materials and metal elements including lithium except the group of 4B may be included in the anode materials. As such materials, there may be exemplified SiC, $Si_3N_4$, $Si_2N_2O$, $Ge_2N_2O$, $SiO_x$ (in the formula, x is located within a range expressed by $0<x \leq 2$.), $SnO_x$ (in the formula, x is located within a range expressed by $0<x \leq 2$), LiSiO, LiSnO, etc.

As the anode materials capable of being doped with and dedoped from lithium, there are enumerated carbon materials, metallic oxides, polymer materials, etc. As the carbon materials, there are exemplified, for example, non-graphitizable carbon, artificial graphite, coke, graphite, vitreous carbon, organic polymer compound sintered bodies, carbon fibers, activated carbon, carbon black, etc. The coke of them includes pitch coke, needle coke, petroleum coke, etc. Further, the organic polymer compound sintered body designates a material obtained by sintering a polymer material such as a phenolic resin or a furan resin at suitable temperature and carbonizing the sintered material. As the metallic oxides, there may be exemplified iron oxide, ruthenium oxide, molybdenum oxide, tin oxide, etc. As the polymer materials, there may be exemplified polyacetylene, polypyrrole, etc.

The cathode 11 is manufactured by applying, for instance, a cathode composite mixture including a positive active material and a binding agent on a cathode current collector and drying the cathode composite mixture. As the cathode current collector, for instance, a metallic foil such as an aluminum foil is employed.

As the binding agent of the cathode composite mixture, a conventionally well-known binding agent or the like can be used. As the cathode composite mixture, a conventionally well-known conductive agent or a conventionally well-known addition agent or the like can be also used.

The nonaqueous electrolyte secondary battery to which the present invention is applied, wherein the positive active material used for the cathode 11 particularly includes a compound expressed by a general formula $Li_m Co_x M'_y M''_z O_2$ (sometimes, refer it simply to as $Li_m Co_x M'_y M''_z O_2$ to, hereinafter) (here, M' designates at least one kind of element selected from Al, Cr, V, Mn and Fe. M" designates at least one kind of element selected from Mg and Ca. Further, x is designated by an expression of $0.9 \leq x < 1$, y is indicated by an expression of $0.001 \leq y \leq 0.05$, z is indicated by an expression of $0.001 \leq z \leq 0.05$, and m is indicated by an expression of $0.5 \leq m \leq 1$). The positive active material will be described later in more detail.

The separator 13 is arranged between the anode 12 and the cathode 11 to prevent a short-circuit due to the physical contact of the anode 12 and the cathode 11. As the separator 13, is employed a microporous polyolefine film such as a polyethylene film, a polypropylene film, etc.

The separator 13 is composed of a porous film made of a polyolefine material such as polypropylene or polyethylene, or a porous film made of an inorganic material such as a ceramic non-woven fabric, and may have a structure that two or more kinds of these porous films are laminated.

As an electrolyte, there may be utilized any of nonaqueous electrolyte solution in which electrolyte salt is dissolved in an organic solvent, a solid electrolyte including electrolyte salt, a gel electrolyte obtained by impregnating organic polymers with organic solvent and electrolyte salt, etc.

As the electrolyte salts, there may be employed, for example, $LiPF_6$, $LiClO_4$, $LiAsF_6$, $LiBF_4$, $LiB(C_6H_5)_4$, $CH_3SO_3Li$, $CF_3SO_3Li$, $LiCl$, $LiBr$, etc.

As the nonaqueous electrolyte solution, can be used solution prepared by properly combining the organic solvent with the electrolyte salt. Further, as the organic solvents and the electrolyte salts, any of conventionally well-known organic solvents used for such a battery can be employed.

As the specific organic solvents, there may be exemplified, for example, propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-diokolane, diethyl ether, sulfolane, methyl sulfolane, acetonitrile, propionitrile, anisole, acetate, butyrate, propionate, etc.

As the solid electrolytes, there may be employed any of materials having lithium ionic conductivity such as inorganic solid electrolytes, solid polymer electrolytes, etc. As the specific inorganic solid electrolytes, there may be exemplified, lithium nitride, lithium iodide, etc. The solid polymer electrolyte comprises electrolyte salt and a polymer compound for dissolving the electrolyte salt. As the specific polymer compounds, ether polymers such as polyethylene oxide or bridged polyethylene oxide, polymethacrylate, acrylate, etc. may be independently used or each of them may be copolymerized or mixed with molecules and the mixture may be used.

As the organic polymers used for the gel electrolyte, there may be employed various kinds of polymers which absorb the organic solvent to gel. As the specific organic polymers, there may be utilized fluorinated polymers such as polyvinylidene fluoride or polyvinylidene fluoride-co-hexafluoropropylene, ether polymers such as polyethylene oxide or bridged polyethylene oxide, polyacrylonitrile, etc. Especially, fluorinated polymers are preferably employed from the viewpoint of oxidation-reduction stability. These organic polymers contain electrolyte salts, so that an ionic conductivity is achieved.

As the positive active material of the nonaqueous electrolyte secondary battery, a compound expressed by a general formula $LiCoO_2$ (refer it to as a lithium cobalt oxide, hereinafter) has been hitherto widely put to practical use. This lithium cobalt oxide belongs to a hexagonal system represented by a space group of R-3m and has a crystal structure formed by systematically laminating a layer composed of cobalt, a layer composed of oxygen and a layer composed of lithium. When a charging operation advances, lithium is dedoped from the lithium layer, so that the crystal structure of the lithium cobalt oxide becomes unstable and a part of the layer structure decays. Especially, under an environment of high temperature, since the thermal vibration of atoms constituting the crystal structure is violent, the above-described decay process is undesirably accelerated.

Thus, in the lithium cobalt oxide, a part of cobalt may be considered to be replaced by aluminum or chromium or the like which is an element high in bond energy with oxygen. In this manner, the structure in a charged state after lithium is dedoped is strengthened so that the stability of the crystal structure can be improved.

However, when a part of cobalt of the lithium cobalt oxide is replaced by aluminum or chromium or the like, atoms having different properties are present in the crystal system. Therefore, the diffusion of lithium ions is prevented in the crystal, so that a capacity and a charging and discharging efficiency are inconveniently deteriorated.

Further, as described in (for example, Solid State Ionics 93(1997) 227), it has been known that when lithium or cobalt in the lithium cobalt oxide is replaced by magnesium or calcium different in valence number, an electronic conductivity is improved.

However, when the amount of replacement by magnesium or calcium is increased, not only the capacity is caused to be decreased, but also the decay of the crystal structure is undesirably accelerated.

In this case, even when a group having aluminum or chromium or the like, and a group having magnesium and calcium are respectively independently dissolved in the lithium cobalt oxide under a state of solid solution, any of the above-described bad effects is inconveniently generated.

Thus, according to the present invention, in the lithium cobalt oxide as the positive active material, is employed a compound in which one or more kinds of elements respectively from a group having Al, Cr, V, Mn and Fe, and from a group having Mg and Ca are combined together to form solid solution and the amount of them is respectively optimized. The above-described compound is used as the positive active material, so that the nonaqueous electrolyte secondary battery can exhibit an effect for suppressing the rise of temperature equivalent to that obtained by adding lithium carbonate even under an overcharged state, eliminate bad effects when the elements of the respective groups are independently dissolved under the state of solid solution and realize excellent battery characteristics, large capacity cyclic characteristics and a storage performance for a long period.

In this embodiment, the positive active material specifically includes a compound expressed by a general formula $Li_mCo_xM'_yM''_zO_2$ (here, M' designates at least one kind of element selected from Al, Cr, V, Mn and Fe. M'' designates at least one kind of element selected from Mg and Ca. Further, x is designated by an expression of $0.9 \leq x < 1$, y is indicated by an expression of $0.001 \leq y \leq 0.05$, z is indicated by an expression of $0.001 \leq z \leq 0.05$, and m is indicated by an expression of $0.5 \leq m \leq 1$).

Since the $Li_mCo_xM'_yM''_zO_2$ can maintain a stable crystal structure even when the nonaqueous electrolyte secondary battery is overcharged, the generation of heat due to the rapid advancement of a decomposition, which has occurred in a conventional positive active material, is suppressed. Therefore, even when an amount of addition of lithium carbonate for early and assuredly operating the current cut-off means 5 is decreased, an effect for suppressing the rise of temperature of the battery equal to or higher than that upon addition of lithium carbonate can be obtained.

Accordingly, the $Li_mCo_xM'_yM''_zO_2$ is employed as the positive active material, so that the large capacity corresponding to the addition amount of lithium carbonate can be realized and the rise of temperature of the battery upon overcharging can be suppressed. Further, in the $Li_mCo_xM'_yM''_zO_2$, since specific elements having specific combination are dissolved in a state of solid solution and the amount of each of the elements is optimized, the $Li_mCo_xM'_yM''_zO_2$ shows a large capacity and good cyclic characteristics.

Here, when x is smaller than 0.9, cobalt which contributes to a charging and discharging reaction is decreased, so that a capacity is caused to be lowered. Further, when y is smaller than 0.001, a stable structure cannot be maintained under an overcharged state and a suppressing effect for the rise of temperature of the battery is imperfect. When y exceeds 0.05, the diffusion of lithium ions in the crystal is prevented and the capacity and a charging and discharging efficiency are deteriorated. Further, similarly, when z is smaller than 0.001, the stable crystal structure under an overcharged state cannot be maintained and the effect for suppressing the rise of temperature of the battery becomes insufficient. Further, also when z exceeds 0.05, the diffusion of lithium ions in the crystal is prevented so that the capacity and the charging and discharging efficiency are deteriorated.

The $Li_mCo_xM'_yM''_zO_2$ is obtained by mixing together a lithium compound, a cobalt compound, a compound of an element selected from aluminum, chromium, vanadium, manganese and iron, and a compound of magnesium or calcium, and sintering the mixture. As specific cobalt compounds, may be employed any of inorganic salts such as cobalt carbonate, cobalt nitrate, etc., oxides such as cobalt oxide, hydroxides, etc. As for the lithium compound or the compounds of elements selected from aluminum, chromium, vanadium, manganese and iron, inorganic salts, oxides, hydroxides or the like may be employed.

As the compound of magnesium or calcium, inorganic salts, oxides or hydroxides, etc. may be used. In this case, in order to desirably disperse or dissolve magnesium atoms or calcium atoms in the crystal of lithium cobalt oxide in a state of solid solution, inorganic salts whose decomposition temperature is low are preferably employed. Especially, carbonates such as magnesium carbonate, calcium carbonate, etc. are preferable.

Further, the nonaqueous electrolyte secondary battery includes as the positive active material, a compound expressed by a general formula $Li_mM_xM'_yM''_zO_2$ especially, $Li_mCo_xM'_yM''_zO_2$ and the current cut-off means 5 as shown in FIG. 1. The nonaqueous electrolyte secondary battery is provided with the current cut-off means 5, and accordingly, the nonaqueous electrolyte secondary battery can further assuredly obtain the effect for suppressing the rise of temperature of the battery realized by suppressing the heat generation of the positive active material itself. As the current cut-off means 5, may be utilized a current cut-off means ordinarily provided in such a battery and capable of cutting off the current in accordance with the internal pressure of the battery.

As described above, since the compound expressed by a general formula $Li_mM_xM'_yM''_zO_2$, particularly, $Li_mCo_xM'_yM''_zO_2$ is included in the battery as the positive active material, the nonaqueous electrolyte secondary battery has a large capacity and is excellent in its charging and discharging cyclic performance. If the nonaqueous electrolyte secondary battery should be overcharged, the rise of temperature of the battery could be suppressed. Therefore, the positive active material including $Li_mCo_xM'_yM''_zO_2$ is used so that, while the nonaqueous electrolyte secondary battery maintains the large capacity, the battery can suppress the rise of temperature of the battery under an overcharged state.

EXAMPLES

Example 1

Now, Examples of the present invention will be described on the basis of specific experimental results. However, it is to be understood that the present invention is not limited to the Examples.

Experiment 1-1

Initially, the numerical ranges of y and z in $Li_mCo_x$-$Al_yMg_zO_2$ were examined.

Sample 1

Firstly, a positive active material was manufactured as described below. Commercialized lithium carbonate, cobalt oxide, aluminum hydroxide and magnesium carbonate were mixed together in the mole ratio of Li, Co, Al and Mg 1.02: 0.98:0.01:0.01. The obtained mixture was sintered in dry air current by using a crucible made of alumina. When the produced powder was quantitatively analyzed by an atomic absorption analysis method, the composition of $LiCo_{0.98}Al_{0.01}Mg_{0.01}O_2$ was recognized. When an X-ray diffraction measurement was carried out for this powder, it was recognized that the pattern of the powder was similar to the pattern of $LiCoO_2$ existing in 36-1004 of the ICDD (International Centre for Diffraction Data) and formed a similar layer structure to that of $LiCoO_2$.

When the amount of lithium carbonate included in the powder was measured, it was recognized that the lithium carbonate was not included. The amount of lithium carbonate was obtained by decomposing a sample by sulfuric acid, introducing $Co_2$ thus produced to the solution of barium chloride and sodium hydroxide to absorb $Co_2$, then, titrating standard hydrochloric acid solution to determine $Co_2$ and converting the amount of $Co_2$.

Then, the powder of 86 wt % which was produced as described above as the positive active material, graphite of 10 wt % as a conductive agent and polyvinylidene fluoride of 4 wt % as a binding agent were mixed together and the mixture was dispersed in N-methyl-2-pyrrolidone to obtain cathode composite mixture slurry. The cathode composite mixture slurry was uniformly applied on both the surfaces of an elongated aluminum foil having the thickness of 20 μm and dried, and then the aluminum foil with the cathode composite mixture slurry applied was compressed by a roller press machine to get an elongated cathode. When the packing density of the cathode was measured, it was 3.2 g/cm$^3$.

Subsequently, polyvinylidene fluoride of 10 wt % was mixed with powdered artificial graphite of 90 wt % and the mixture was dispersed in N-methyl-2-pyrrolidone to get an anode composite mixture slurry. The anode composite mixture slurry was uniformly applied on both the surfaces of a copper foil having the thickness of 10 μm, dried and then the copper foil with the anode composite mixture slurry applied was compressed by a roller press machine to obtain an elongated anode. The obtained elongated cathode and the elongated anode were laminated through a porous polyolefine film and the laminated body was coiled many times to manufacture a spirally coiled electrode body. This electrode body was contained in an iron battery can plated with nickel. Insulating plates were arranged in the upper and lower parts of the electrode body so as to sandwich the electrode body in therebetween.

Then, a cathode lead made of aluminum was drawn out from a cathode current collector and welded to the protruding part of a current cut-off means whose electric conduction to a battery cover was ensured. Further, an anode lead made of nickel was drawn out from an anode current collector and welded to the bottom part of the battery can.

$LiPF_6$ was dissolved in a mixed solvent of ethylene carbonate and methyl ethyl carbonate mixed in the volumetric mixture ratio 11:1 so as to have the concentration of 1 mol/dm³ so that nonaqueous electrolyte solution was prepared.

Finally, the nonaqueous electrolyte solution was injected to the battery can in which the electrode body was accommodated was caulked through an insulating sealing gasket to fix a safety valve, a PTC element and the battery cover. Thus, a cylindrical nonaqueous electrolyte secondary battery having the outside diameter of 18 mm and the height of 65 mm was manufactured.

Sample 2

A positive active material was manufactured in the same manner as that of the Sample 1 except that the mixture ratio of aluminum hydroxide was changed to have y=0.03, that is, $LiCo_{0.98}Al_{0.03}Mg_{0.01}O_2$ was manufactured. The positive active material was used to manufacture a nonaqueous electrolyte secondary battery. When the amount of lithium carbonate included in the positive active material was measured, it was recognized that the lithium carbonate was not included in the positive active material.

Sample 3

A positive active material was manufactured in the same manner as that of the Sample 1 except that the mixture ratio of magnesium carbonate was changed to have z=0.03, that is, $LiCo_{0.98}Al_{0.01}Mg_{0.03}O_2$ was manufactured. The positive active material was used to manufacture a nonaqueous electrolyte secondary battery. When the amount of lithium carbonate included in the positive active material was measured, it was recognized that the lithium carbonate was not included in the positive active material.

Sample 4

A positive active material was manufactured in the same manner as that of the Sample 1 except that the mixture ratio of aluminum hydroxide and magnesium carbonate was changed to have y=0.001 and z=0.001, that is, $LiCo_{0.98}Al_{0.001}Mg_{0.001}O_2$ was manufactured. The positive active material was used to manufacture a nonaqueous electrolyte secondary battery. When the amount of lithium carbonate included in the positive active material was measured, it was recognized that the lithium carbonate was not included in the positive active material.

Sample 5

A positive active material was manufactured in the same manner as that of the Sample 1 except that the mixture ratio of aluminum hydroxide and magnesium carbonate was changed to have y=0.05 and z=0.05, that is, $LiCo_{0.98}Al_{0.05}Mg_{0.05}O_2$ was manufactured. The positive active material was used to manufacture a nonaqueous electrolyte secondary battery. When the amount of lithium carbonate included in the positive active material was measured, it was recognized that the lithium carbonate was not included in the positive active material.

Sample 6

Aluminum hydroxide and magnesium carbonate were not used to have y=z=0 and produce $LiCoO_2$. Lithium carbonate was added to the $LiCoO_2$ so as to have the content of 2.5 wt %. The obtained product was used as a positive active material to manufacture a nonaqueous electrolyte secondary battery.

Sample 7

Aluminum hydroxide and magnesium carbonate were not used to have y=z=0 and produce $LiCoO_2$. Lithium carbonate was added to the $LiCoO_2$ so as to have the content of 5.0 wt %. The obtained product was used as a positive active material to manufacture a nonaqueous electrolyte secondary battery.

Sample 8

A positive active material was manufactured in the same manner as that of the Sample 1 except that the mixture ratio of aluminum hydroxide and magnesium carbonate was changed to have y=0.0005 and z=0.0005, that is, $LiCo_{0.98}Al_{0.0005}Mg_{0.0005}O_2$ was manufactured. The positive active material was used to manufacture a nonaqueous electrolyte secondary battery. When the amount of lithium carbonate included in the positive active material was measured, it was recognized that the lithium carbonate was not included in the positive active material.

Sample 9

A positive active material was manufactured in the same manner as that of the Sample 1 except that the mixture ratio of aluminum hydroxide and magnesium carbonate was changed to have y=0.07 and z=0.07, that is, $LiCo_{0.98}Al_{0.07}Mg_{0.07}O_2$ was manufactured. The positive active material was used to manufacture a nonaqueous electrolyte secondary battery. When the amount of lithium carbonate included in the positive active material was measured, it was recognized that the lithium carbonate was not included in the positive active material.

An initial capacity and maximum achievable temperature on the surface of the battery upon overcharging were respectively measured for each of the Samples 1 to 9 manufactured as described above.

1. Initial Capacity

After a charging operation was carried out under the conditions of environmental temperature of 23° C., charging voltage of 4.2 V, charging current of 1000 mA and charging time of 2.5 hours, a discharging operation was carried out under the conditions of discharging current of 360 mA and finish voltage of 2.75V for each nonaqueous electrolyte secondary battery to obtain an initial capacity of each battery at this time.

2. Maximum Achievable Temperature on Surface of Battery in Overcharged State

A charging operation was carried out under the conditions of charging voltage of 4.2 V, charging current of 1000 mA and charging time of 2.5 hours for each nonaqueous electrolyte secondary battery measured the initial capacity as described above. Then, an overcharging operation was further carried out under the condition of charging current of 3000 mA to measure maximum achievable temperature on the surface of the battery.

The results of the initial capacity and the maximum achievable temperature on the surface of the battery under the overcharged state in the Samples 1 to 9 which are measured as described above will be shown in Table 1.

|  | Al y | Mg z | Lithium Carbonate (wt %) | Initial Capacity (mAh) | Maximum Achievable Temperature on Surface of Battery upon Overcharging (° C.) |
|---|---|---|---|---|---|
| Sample 1 | 0.01 | 0.01 | 0 | 1803 | 68 |
| Sample 2 | 0.03 | 0.01 | 0 | 1880 | 65 |
| Sample 3 | 0.01 | 0.03 | 0 | 1807 | 69 |
| Sample 4 | 0.001 | 0.001 | 0 | 1811 | 70 |
| Sample 5 | 0.05 | 0.05 | 0 | 1795 | 62 |
| Sample 6 | 0 | 0 | 2.5 | 1773 | 86 |
| Sample 7 | 0 | 0 | 5 | 1746 | 75 |

-continued

|  | Al y | Mg z | Lithium Carbonate (wt %) | Initial Capacity (mAh) | Maximum Achievable Temperature on Surface of Battery upon Overcharging (° C.) |
|---|---|---|---|---|---|
| Sample 8 | 0.0005 | 0.0005 | 0 | 1815 | 95 |
| Sample 9 | 0.07 | 0.07 | 0 | 1662 | 55 |

It was recognized from the results of the Table 1 that the Samples 1 to 5 including as the positive active material the $Li_mCo_xAl_yMg_zO_2$ in which y is designated by an expression of $0.001 \leq y \leq 0.05$ and z is designated by an expression of $0.001 \leq z \leq 0.05$ showed the initial capacity higher than those of the Samples 6 and 7 employing $LiCoO_2$ as the positive active material and including lithium carbonate in the cathode, and suppressed more the rise of temperature of the battery under the overcharged state than those of the Samples 6 and 7.

It was further understood that the rise of temperature of the battery in the Sample 8 including the $Li_mCo_xAl_yMg_zO_2$ as the positive active material in which y=0.0005 and z=0.0005 arose more apparently than those of the Samples 1 to 5. The cause of the rise of temperature of the battery is considered to be a fact that the positive active material cannot maintain a stable structure. On the contrary, the Sample 9 including as the positive active material the $Li_mCo_xAl_yMg_zO_2$ in which y=0.07 and z=0.07 showed the initial capacity lower than those of the Samples 1 to 5. The cause of the deterioration of the initial capacity is considered to be a fact that the diffusion of lithium ions in the crystal is prevented and a current efficiency is lowered.

Accordingly, it was apparent from the results of the experiment 1 that the $Li_mCo_xAl_yMg_zO_2$ was included in the cathode as the positive active material in which y is designated by an expression of $0.001 \leq y \leq 0.05$ and z is designated by an expression of $0.001 \leq z \leq 0.05$ so that the rise of temperature of the battery under an overcharged state could be suppressed equally to or more than a case in which lithium carbonate is included in a cathode by using a conventional positive active material. Further, it was apparently understood that a large capacity could be obtained correspondingly to the amount of addition of lithium carbonate.

Experiment 1-2

Subsequently, other elements constituting $Li_mCo_xA_yB_zO_2$ were examined.

Sample 10

The powder of $LiCo_{0.98}Al_{0.01}Ca_{0.01}O_2$ was manufactured in the same manner as that of the Sample 1 except that calcium carbonate was used in place of magnesium carbonate. This powder was used as the positive active material to manufacture a nonaqueous electrolyte secondary battery.

Sample 11

The powder of $LiCo_{0.98}Cr_{0.01}Mg_{0.01}O_2$ was manufactured in the same manner as that of the Sample 1 except that chromium oxide was used in place of aluminum hydroxide. This powder was used as the positive active material to manufacture a nonaqueous electrolyte secondary battery.

Sample 12

The powder of $LiCo_{0.98}V_{0.01}Mg_{0.01}O_2$ was manufactured in the same manner as that of the Sample 1 except that vanadium oxide was used in place of aluminum hydroxide. This powder was used as the positive active material to manufacture a nonaqueous electrolyte secondary battery.

Sample 13

The powder of $LiCo_{0.98}Mn_{0.01}Mg_{0.01}O_2$ was manufactured in the same manner as that of the Sample 1 except that manganese oxide was used in place of aluminum hydroxide. This powder was used as the positive active material to manufacture a nonaqueous electrolyte secondary battery.

Sample 14

The powder of $LiCo_{0.98}Fe_{0.01}Mg_{0.01}O_2$ was manufactured in the same manner as that of the Sample 1 except that iron oxide was used in place of aluminum hydroxide. This powder was used as the positive active material to manufacture a nonaqueous electrolyte secondary battery.

An initial capacity and maximum achievable temperature on the surface of the battery under an overcharged state were respectively measured in the same manner as that of the above-described Experiment 1-1 for each of the Samples 10 to 14 manufactured as mentioned above. The results of the Samples 10 to 14 are shown below in Table 2 as well as the results of the Samples 6 and 7 in the Experiment 1.

TABLE 2

|  | y | z | Lithium Carbonate (wt %) | Initial Capacity (mAh) | Maximum Achievable Temperature on Surface of Battery upon Overcharging (° C.) |
|---|---|---|---|---|---|
| Sample 6 | 0 | 0 | 2.5 | 1773 | 68 |
| Sample 7 | 0 | 0 | 5 | 1746 | 75 |
| Sample 10 | Al: 0.01 | Ca: 0.01 | 0 | 1802 | 68 |
| Sample 11 | Cr: 0.01 | Mg: 0.01 | 0 | 1809 | 66 |
| Sample 12 | V: 0.01 | Mg: 0.01 | 0 | 1801 | 69 |
| Sample 13 | Mn: 0.01 | Mg: 0.01 | 0 | 1800 | 64 |
| Sample 14 | Fe: 0.01 | Mg: 0.01 | 0 | 1805 | 66 |

It was understood from the results of the Table 2 that the Sample 10 using Ca in place of Mg in $Li_mCo_xM'_yM''_zO_2$ showed a large initial capacity and suppressed the rise of temperature of the battery under the overcharged state like a case in which Mg was used. Further, each of the Samples 11 to 14 using Cr, V, Mn or Fe as the element M' in $Li_mCo_xM'_yM''_zO_2$ showed a large initial capacity and suppressed the rise of temperature of the battery under the overcharged state similarly to a case in which Al was used as the element M'.

It was understood from the results of the Experiment 1-2 that both when M' was Cr, V, Mn or Fe in $Li_mCo_xM'_yM''_zO_2$ and when M" was Ca, a large initial capacity was obtained and the rise of temperature on the surface of the battery was suppressed.

Example 2

Next, the sectional structure of a nonaqueous secondary battery as a second embodiment of the present invention is shown. Since this nonaqueous secondary battery has the same construction as that of the nonaqueous electrolyte secondary battery shown in FIG. 1, components having the same operations and functions are designated by the same reference numerals and the detailed explanation thereof is omitted.

To the open end part of the same battery can 1 as described above, a battery cover 4, a safety valve mechanism 5 and a positive temperature coefficient element (PTC element) 6 provided inside the battery cover 4 are attached by caulking them through a gasket 7. The inner part of the battery can 1 is sealed. The battery cover 4 is composed of, for instance, the same material as that of the battery can 1. The safety valve mechanism 5 is electrically connected to the battery cover 4 through the positive temperature coefficient element 6, so that when the internal pressure of the battery reaches a prescribed value or higher due to an internal short-circuit or external heating, a disc plate 5a is inverted to disconnect the electrical connection of the battery cover 4 and a spirally coiled electrode body 10. The positive temperature coefficient element 6 serves to restrict a current in accordance with the increase of a resistance value when temperature rises and to prevent an abnormal heat generation due to large current. The positive temperature coefficient element 6 is composed of, for instance, barium titanate semiconductor ceramics. The gasket 7 is made of, for example, an insulating material and asphalt is applied to the surface thereof.

The spirally coiled electrode body 10 is coiled about, for instance, a center pin 14. To the cathode 11 of the spirally coiled electrode body 10, a cathode lead 15 made of aluminum (Al) or the like is connected. To an anode 12, an anode lead 16 made of nickel or the like is connected. The cathode lead 15 is welded to the safety valve mechanism 5 to be electrically connected to the battery cover 4. The anode lead 16 is welded and electrically connected to the battery can 1.

The cathode 11 includes, for instance, cathode composite mixture layers and a cathode current collector layer and has a structure that the cathode composite mixture layers are respectively provided on both the surfaces or one surface of the cathode current collector layer. The cathode current collector layer is made of a metallic foil such as an aluminum foil, a nickel foil or a stainless steel foil. The cathode composite mixture layer includes as a positive active material, manganese-containing oxides and nickel-containing oxides as described below. Further, the cathode composite mixture layer includes a conductive agent such as graphite and a binding agent such as polyvinylidene fluoride as required.

The manganese-containing oxides includes at least one kind of first element selected from a group having lithium, manganese, metal elements except manganese and boron and oxygen. The manganese-containing oxides have, for example, a cubic system (spinel) structure or a tetragonal system structure and a manganese atom is replaced by the first element in a part of the site of manganese atoms. When the first element is designated by Ma, the chemical formula of the manganese-containing oxide is expressed by $Li_sMn_{2-t}Ma_tO_4$. Here, the value of s is located within a range expressed by $0.9 \leq s \leq 2$ and the value of t is located within a range expressed by $0.01 \leq t \leq 0.5$. That is, the composition ratio the first element to manganese Ma/Mn is located within a range in the mole ratio 0.01/1.99 or larger and 0.5/1.5 or smaller.

As the first element, is specifically preferable at least one kind of element selected from a group including iron (Fe), cobalt (Co), nickel, copper (Cu), zinc (Zn), aluminum (Al), tin (Sn), chromium (Cr), vanadium (V), titanium (Ti), magnesium (Mg), calcium (Ca), strontium (Sr), boron, gallium (Ga), indium (In), silicon (Si) and germanium (Ge). The manganese-containing oxides using these elements as the first elements can be relatively easily obtained and are chemically stable.

Nickel-containing oxides includes at least one kind of second element selected from a group including lithium, nickel, metal elements except nickel and boron and oxygen. The nickel-containing oxide has, for instance, a layer structure and a nickel atom is replaced by the second element in a part of the site of nickel atoms. When the second element is designated by Mb, the chemical formula of the nickel-containing oxide is typically expressed by $LiNi_{1-u}Mb_uO_2$.

The composition ratio lithium to oxygen is not limited to Li:O=1:2 and the value of u may be located within a range expressed by $0.01 \leq u \leq 0.5$. That is, the composition ratio the second element to nickel Mb/Ni is located within a range expressed in the mole ratio 0.01/0.99 or larger and 0.5/0.5 or smaller.

As the second element, is preferable at least one kind of element selected from a group including iron, cobalt, manganese, copper, zinc, aluminum, tin, chromium, vanadium, titanium, magnesium, calcium, strontium, boron, gallium, indium, silicon and germanium. The manganese-containing oxides using these elements as the second elements can be relatively easily obtained and are chemically stable.

The manganese-containing oxide and the nickel-containing oxide are considered to stabilize their crystal structures by replacing a part of manganese or nickel by other elements described above. In such a way, high temperature retaining characteristics can be improved in the nonaqueous electrolyte secondary battery. The composition ratio the first element to manganese Ma/Mn is set to in the mole ratio 0.01/1.99 or higher and 0.5/1.5 or lower and the composition ratio of the second element to nickel Mb/Ni is set to in the mole ratio 0.01/0.99 or higher and 0.5/0.5 or lower from the viewpoints that when the amount of replacement is smaller than the above described value, a sufficient effect cannot be obtained, and when the amount of replacement is larger than the above described value, a high load discharging capacity after the storage at high temperature is deteriorated.

Further, in the cathode 11, the average specific surface area of the positive active material is set to 0.2 m$^2$/g or higher and 1.5 m$^2$/g or lower and the amount of $Li_2CO_3$ remaining in the positive active material is set to 5.0 wt % or lower relative to all the weight of the positive active material. Here, the average specific surface area of the positive active material is obtained by multiplying the specific surface area of each material included as the positive active material by the rate of weight of each material included in the positive active material and adding the value thus obtained thereto. Further, the amount of $Li_2CO_3$ remaining in the positive active material designates a rate occupied in all the weight of the positive active material.

Ordinarily, when charging and discharging cycles are repeated in the nonaqueous electrolyte secondary battery, the reaction area of a usable positive active material is reduced. Thus, in order to assuredly maintain charging and discharging cyclic characteristics, the positive active material needs to have a reaction area to some degree. However, conversely, when the reaction area of the positive active material is too large, the amount of water adhering to the surface of the positive active material is undesirably increased to deteriorate the charging and discharging cyclic characteristics. Further, $Li_2CO_3$ as one kind of synthetic materials of the manganese-containing oxide and the nickel-containing oxide remains to some degree in the positive active material during a process of a synthesizing reaction depending on a producing method. For example, while the positive active material is synthesized, $Li_2CO_3$ cannot be removed and may remain during the sintering process of the active material. The remaining $Li_2CO_3$ disadvantageously adheres to the surface of the positive active material to reduce the surface area of the reactive positive active material and lower the content of the active material which contributes to a charging operation.

Thus, the inventors of the present invention had a knowledge that while the amount of $Li_2CO_3$ remaining in the positive active material was taken into account, the average specific surface area of the positive active material was prescribed to improve the charging and discharging cyclic characteristics.

In case the average specific surface area of the positive active material is lower than 0.2 m$^2$/g, when charging and discharging operations are repeated, a reaction area will be insufficient to deteriorate cyclic characteristics. On the other hand, when the average specific surface area of the positive active material exceeds 1.5 m$^2$/g, the amount of water adhering to the surface of the positive active material is increased to deteriorate the cyclic characteristics. Further, when the amount of Li$_2$CO$_3$ remaining in the positive active material exceeds 5 wt %, the amount of Li$_2$CO$_3$ adhering to the surface of the positive active material is increased so that the positive active material cannot ensure the surface area necessary for a battery reaction.

Accordingly, the average specific surface area of the positive active material is set to 0.2 m$^2$/g or higher and 1.5 m$^2$/g or lower and the remaining amount of Li$_2$CO$_3$ is set to 5.0 wt % or lower relative to all the weight of the positive active material, so that the nonaqueous electrolyte secondary battery in which the positive active material can maintain a stable structure and excellent charging and discharging cyclic characteristics are obtained can be realized.

The manganese-containing oxide is extremely degraded in an electrolyte described below under a high temperature atmosphere. When the content of the manganese-containing oxide is large, an internal pressure is increased after a storage at high temperature to lower a capacity. Further, since the nickel-containing oxide has a low discharging potential, when the content of the nickel-containing oxide is higher than the above described ratio, a heavy load discharging capacity with a high potential cut off after the storage under high temperature is lowered. Accordingly, the mixture ratio the manganese-containing oxide to the nickel-containing oxide in the cathode 11 is preferable in the mass ratio the manganese-containing oxide of 10 to 80 to the nickel-containing oxide of 90 to 20. The average particle diameter of the manganese-containing oxide and the nickel-containing oxide are respectively preferably 30 μm or smaller. When the average particle diameter is larger than the above-described value, the expansion and contraction of the cathode 11 due to the charging and discharging operations cannot be completely suppressed and satisfactory charging and discharging cyclic characteristics cannot be obtained under ordinary temperature.

The manganese-containing oxides and the nickel-containing oxides are obtained in such a manner that, for instance, lithium compounds, manganese compounds and compounds including the first elements, or lithium compounds, nickel compounds and compounds including the second elements are prepared, these compounds are mixed together in a desired ratio, and then, the mixture is heated and sintered at the temperature of 600° C. to 1000° C. under an atmosphere having oxygen. At this time, as the compounds serving as raw materials, there are employed carbonates, hydroxides, oxides nitrates, organic acid salts, etc.

Further, the average specific surface area of a negative active material contained in the anode 12 is preferably 0.5 m$^2$/g or larger and 10 m$^2$/g or smaller. The negative active material whose average specific surface area satisfies the above-described range is employed, so that the nonaqueous electrolyte battery secondary battery whose battery characteristics can be improved, whose initial capacity is large and self-discharging rate of which is low is obtained. In this connection, the average specific surface area of the negative active material is get by multiplying the specific surface area of each material included as the negative active material by the rate of weight of each material included in the negative active material and adding respective values thus obtained.

In the nonaqueous electrolyte secondary battery as constructed above, since the average specific surface area of the positive active material included in the cathode 11 ranges from 0.2 m$^2$/g to 1.5 m$^2$/g and the remaining amount of Li$_2$CO$_3$ is 5.0 wt % or smaller relative to all the weight of the positive active material, the cyclic characteristics are improved.

Further, in the nonaqueous electrolyte secondary battery, when a charging operation is carried out, for instance, lithium ions are dedoped from the cathode 11 and doped to the anode 12 through the electrolyte with which a separator 13 is impregnated. When a discharging operation is carried out, for instance, the lithium ions are dedoped from the anode 12 and doped to the cathode 11 through the electrolyte with which the separator 13 is impregnated. In this case, since the cathode 11 contains the manganese-containing oxide having the first element and the nickel-containing oxide having the second element, the capacity of the battery is not lowered even after the battery is stored under high temperature and a large capacity maintaining/retention ratio is obtained. For example, even when a heavy load discharging operation is carried out under a condition of high potential with 3.3 V cut off, large discharging energy can be obtained. This nonaqueous electrolyte secondary battery can be manufactured in such a manner as described below.

Initially, is prepared the positive active material in which the manganese-containing oxide and the nickel-containing oxide are contained, the average specific surface area is 0.2 m$^2$/g or larger and 1.5 m$^2$/g or smaller and the remaining amount of Li$_2$CO$_3$ is 0.5 wt % or smaller relative to all the weight of the positive active material.

Then, this positive active material is mixed with a conductive agent and a binding agent as required to prepare a cathode composite mixture. The cathode composite mixture is dispersed in a solvent such as N-methyl-2-pyrrolidone to produce paste type cathode composite mixture slurry. The cathode composite mixture slurry is applied to a cathode current collector layer to dry the solvent. Then, the cathode composite mixture slurry with the solvent dried is compression-molded by a roller press machine or the like to form the cathode composite mixture layer and manufacture the cathode 11.

Then, the negative active material is mixed with a binding agent as necessary to prepare an anode composite mixture. The anode composite mixture is dispersed in a solvent such as N-methyl-2-pyrrolidone to have paste type anode composite mixture slurry. The anode composite mixture slurry is applied to an anode current collector layer to dry the solvent. Then, the anode composite mixture slurry with the solvent dried is compression-molded by the roller press machine or the like to form an anode composite mixture layer and manufacture the anode 12.

Subsequently, the cathode lead 15 is attached to the cathode current collector layer by welding and the anode lead 16 is attached to the anode current collector layer by welding or the like. After that, the cathode 11 and the anode 12 are coiled through the separator 13. The end part of the cathode lead 15 is welded to the safety valve mechanism 5 and the end part of the anode lead 16 is welded to the battery can 1. The cathode 11 and the anode 12 thus coiled are sandwiched in between a pair of insulating plates 2 and 3 and accommodated in the battery can 1. After the cathode 11 and the anode 12 are accommodated in the battery can 1, the nonaqueous electrolyte solution is injected into the battery can 1 to impregnate the separator 13 therewith.

Then, the battery can 4, the safety valve mechanism 5 and the positive temperature coefficient element 6 are fixed to the open end part of the battery can 1 by caulking the gasket 7. Thus, a nonaqueous electrolyte secondary battery having the same structure shown in FIG. 1 is formed.

Example 3

A nonaqueous electrolyte secondary battery shown as a third embodiment of the present invention has the same structure as that of the nonaqueous electrolyte secondary battery shown in FIG. 1 except that an anode includes specific negative active materials. Therefore, components having the same operations and functions as those of the nonaqueous electrolyte secondary battery of the first embodiment are designated by the same reference numerals and the explanation thereof will be omitted.

In the nonaqueous electrolyte secondary battery shown as the third embodiment, a cathode 11 is composed of, for instance, a cathode composite mixture layer and a cathode current collector layer. The cathode composite mixture layer is provided on both the surfaces or one surface of the cathode current collector layer in a structure. The cathode current collector layer is composed of a metallic foil, for example, an aluminum foil, a nickel foil or stainless steel foil. In the cathode composite mixture layer, manganese-containing oxide and nickel-containing oxide are contained as positive active materials, and a conductive agent such as graphite and a binding agent such as polyvinylidene fluoride are further included as required.

This nonaqueous electrolyte secondary battery, wherein the average specific surface area of these positive active materials is $0.2 \text{ m}^2/\text{g}$ or larger and $1.5 \text{ m}^2/\text{g}$ or smaller and the amount of $Li_2CO_3$ remaining in the positive active material is 5.0 wt % or lower relative to all the weight of the positive active material.

Here, the average specific surface area of the positive active material is got by multiplying the specific surface area of each material included as the positive active material by the rate of weight of each material included in the positive active materials and adding the obtained respective values. Further, $Li_2CO_3$ remaining in the positive active materials is one kind of the synthetic materials of the manganese-containing oxide and the nickel-containing oxide and produced during a synthesizing operation.

The average specific surface area of the positive active material is $0.2 \text{ m}^2/\text{g}$ or larger and $1.5 \text{ m}^2/\text{g}$ or smaller and the remaining amount of $Li_2CO_3$ is 5.0 wt % or lower relative to all the weight of the positive active material, so that charging and discharging cyclic characteristics are improved.

An anode 12 has, for instance, a structure in which an anode composite mixture layer is respectively applied to both the surfaces or one surface of an anode current collector layer similarly to the cathode 11. The anode current collector layer is composed of a metallic foil, for instance, a copper foil, a nickel foil or a stainless steel foil. The anode composite mixture layer is composed of one kind or two or more kinds of negative active materials capable of absorbing or desorbing lithium, that is, capable of being doped with or dedoped from lithium under, for instance, the potential of 2 V or lower by taking lithium metal or the potential of lithium metal as a reference as described above, and further includes the binding agent such as polyvinylidene fluoride as required.

Further, in the anode 12, the average specific surface area of the negative active material is set to $0.5 \text{ m}^2/\text{g}$ or larger and $10 \text{ m}^2/\text{g}$ or smaller. Here, the average specific surface area of the negative active material is got by multiplying the specific surface area of each material included as the negative active material by the rate of weight of each material included in the negative active materials and adding the obtained respective values.

Ordinarily, when charging and discharging cycles are repeated in the nonaqueous electrolyte secondary battery, the reaction area of a usable negative active material is reduced. Thus, in order to realize the nonaqueous electrolyte secondary battery having a large initial capacity or a low self-discharge rate, the negative active material needs to have a reaction area to some degree. However, conversely, when the reaction area of the negative active material is too large, the amount of a coat formed on the surface of the negative active material is undesirably increased so that desired battery characteristics cannot be achieved.

Thus, the inventors of the present invention had a knowledge that the battery characteristics could be improved and the large initial capacity or the low self-discharge rate could be achieved by prescribing the average specific surface area of the negative active material. In case the average specific surface area of the negative active material is lower than $0.5 \text{ m}^2/\text{g}$, when charging and discharging operations are repeated, the reaction area will be insufficient to deteriorate the battery characteristics. On the other hand, when the average specific surface area of the negative active material exceeds $10 \text{ m}^2/\text{g}$, the amount of a coat formed on the surface of the negative active material due to a reaction with nonaqueous electrolyte solution is increased to deteriorate the battery characteristics.

Accordingly, the average specific surface area of the positive active material is set to $0.5 \text{ m}^2/\text{g}$ or larger and $10 \text{ m}^2/\text{g}$ or smaller, so that the nonaqueous electrolyte secondary battery having the large discharging capacity and the low self-discharge rate is realized.

Since the average specific surface area of the negative active material included in the anode is $0.5 \text{ m}^2/\text{g}$ or larger and $10 \text{ m}^2/\text{g}$ or smaller, the above-described nonaqueous electrolyte secondary battery has desired battery characteristics, large discharging capacity and low self-discharge rate. The nonaqueous electrolyte secondary battery can be manufactured in such a manner as mentioned below. Initially, is prepared a cathode composite mixture by mixing the positive active material containing the manganese-containing oxide and the nickel-containing oxide with the conductive agent and the binding agent as required. The cathode composite mixture is dispersed in a solvent such as N-methyl-2-pyrrolidone to produce paste type cathode composite mixture slurry. The cathode composite mixture slurry is applied to the cathode current collector layer to dry the solvent. Then, the cathode composite mixture slurry with the solvent dried is compression-molded by a roller press machine or the like to form the cathode composite mixture layer and manufacture the cathode 11.

Then, the negative active material whose average specific surface area ranges from $0.5 \text{ m}^2/\text{g}$ to $10 \text{ m}^2/\text{g}$ is prepared. The negative active material is mixed with the binding agent as necessary to prepare an anode composite mixture. The anode composite mixture is dispersed in a solvent such as N-methyl-2-pyrrolidone to have paste type anode composite mixture slurry. The anode composite mixture slurry is applied to the anode current collector layer to dry the solvent. Then, the anode composite mixture slurry with the solvent dried is compression-molded by the roller press machine or the like to form the anode composite mixture layer and manufacture the anode 12.

Subsequently, a cathode lead 15 is attached to the cathode current collector layer by welding and an anode lead 16 is attached to the anode current collector layer by welding or the like. After that, the cathode 11 and the anode 12 are coiled through a separator 13. The end part of the cathode lead 15 is welded to a safety valve mechanism 5 and the end part of the anode lead 16 is welded to a battery can 1. The cathode 11 and the anode 12 thus coiled are sandwiched in between a pair of insulating plates 2 and 3 and accommodated in the battery can 1. After the cathode 11 and the anode 12 are accommodated in the battery can 1, the nonaqueous electrolyte solution is injected into the battery can 1 to impregnate the separator 13 therewith.

Then, a battery cover 4, the safety valve mechanism 5 and a positive temperature coefficient element 6 are fixed to the open end part of the battery can 1 by caulking them through a gasket 7. Thus, a nonaqueous electrolyte secondary battery shown in FIG. 1 is formed.

Although the present invention is explained by way of the above-described second and third embodiments, the present invention is not limited to the above description and may be properly changed within a scope without departing the gist of the present invention.

For example, in the above-described embodiments, although the cylindrical nonaqueous electrolyte secondary battery having the coiling structure are explained, the present invention may be applied to cylindrical nonaqueous electrolyte secondary batteries having other constructions. The form of the battery is not limited to the cylindrical form and the present invention may be likewise applied to nonaqueous electrolyte secondary batteries having various forms such as a coin type, a button type, a prismatic type, a type with electrode elements sealed in a metal-polymer laminate film, etc.

Further, in the above-described embodiments, although the cases in which the nonaqueous electrolyte solution obtained by dissolving the electrolyte salts in the nonaqueous solvent are described, the present invention is not limited thereto, and may be also applied to cases using various kinds of nonaqueous electrolytes such as gel electrolytes composed of electrolyte salts, swelling solvents and matrix polymers, solid polymer electrolytes obtained by compounding ion conductive polymers with electrolyte salts, and nonaqueous electrolyte materials obtained by mixing solid inorganic electrolytes including ion conductive inorganic ceramics, glass, ionic crystals, etc., as main components with nonaqueous electrolyte solution.

For instance, when the gel electrolyte is employed as the nonaqueous electrolyte, when the ionic conductivity of the gel electrolyte is 1 mS/cm or higher, any composition of the gel electrolyte and any structure of the matrix polymer forming the gel electrolyte may be utilized.

As the specific matrix polymers, there may be employed polyacrylonitrile, polyvinylidene fluoride, copolymers of polyvinylidene fluoride and polyhexafluoro propylene, polytetrafluoro ethylene, polyhexafluoro propylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, etc. Especially, polyacrylonitrile, polyvinylidene fluoride, polyhexafluoro propylene, polyethylene oxide, etc. are preferably employed from the viewpoint of electrochemical stability.

Since the weight of the matrix polymer necessary for producing the gel electrolyte is different depending on the compatibility of the matrix polymer with the nonaqueous electrolyte solution, it is difficult to unconditionally prescribe the weight. However, the weight of the matrix polymer preferably ranges from 5 wt % to 50 wt % relative to the nonaqueous electrolyte solution.

Example 4

Experiment 4-1

In the Experiment 4-1, a nonaqueous electrolyte secondary battery was manufactured by using positive active materials respectively different in the amount of $Li_2CO_3$ remaining in the positive active materials and average specific surface area. Then, the difference in battery characteristics between the nonaqueous electrolyte secondary batteries due to the difference in the remaining amount of $Li_2CO_3$ and the average specific surface area was evaluated.
Sample 15
Manufacture of Cathode Firstly, lithium carbonate ($Li_2CO_3$), manganese dioxide ($MnO_2$) and chromium trioxide ($Cr_2O_3$) were mixed together. The mixture thus obtained was sintered in air at the temperature of 850° C. for 5 hours to produce manganese-containing oxide $LiMn_{1.8}Cr_{0.2}O_4$ containing lithium, manganese and chromium as a first element (Ma). Further, lithium hydroxide (LiOH), nickel monoxide (NiO) and cobalt monoxide (CoO) were mixed together and the mixture thus obtained was sintered in air at the temperature of 750° C. for 5 hours to produce nickel-containing oxide $LiNi_{0.8}Co_{0.02}O_2$ containing lithium, nickel and cobalt as a second element (Mb).

Then, the manganese-containing oxide and the nickel-containing oxide thus obtained were changed to particles having the average diameter of 5 μm. After that, the pulverized and classified manganese-containing oxide and nickel-containing oxide were mixed in the weight ratio 4:6. The average particle diameter of a positive active material was measured by a laser diffraction particle size analyzing method.

The average specific surface area of the positive active material was 1.5 $m^2/g$. In this connection, the average specific surface area of the positive active material is obtained by multiplying the specific surface area of each of the manganese-containing oxide and the nickel-containing oxide by the rate of weight of each of them and adding the respective values thus obtained. Further, each of the specific surface areas of the manganese-containing oxide and the nickel-containing oxide was measured by a BET (Brunauer Emmett Teller) method.

Further, the amount of $Li_2CO_3$ remaining in the positive active material was 0.5 wt %. Further, the amount of $Li_2CO_3$ remaining in the positive active material is obtained by multiplying the remaining $Li_2CO_3$ of each active material by the rate of weight of each active material and adding the respective values thus obtained. The remaining amount of $Li_2CO_3$ was measured by an AGK type $CO_2$ simple accurate measuring method.

Then, the positive active material of 91 parts by weight was mixed with graphite of 6 parts by weight as a conductive agent and polyvinylidene fluoride of 3 parts by weight as a binding agent to prepare a cathode composite mixture. After that, the cathode composite mixture was dried to form a disc form with the diameter of 15.5 mm and obtain a pellet type cathode.
Manufacture of Anode Firstly, coal tar based pitch of 30 parts by weight as a binder was added to coal based coke of 100 parts by weight as a filler and they were mixed together at about 100° C. The mixture was compression-molded by a press machine and thermally treated at the temperature of 1000° C. or lower to manufacture a carbon compact. Subsequently, a pitch impregnation/thermal treatment process in which the carbon compact was impregnated with the coal tar based pitch melted at 200° C. or lower and thermally treated at 1000° C. or lower was repeated several times. After that, the thermally treated compact was thermally treated at 2700° C. in an inert atmosphere to manufacture a graphitized compact. Then, the graphitized compact was pulverized and classified to obtain powder.

When the structural analysis of the produced graphitized powder was carried out by an X-ray diffraction method, the spacing of a (002) plane was 0.337 nm and the C-axis crystallite thickness of the (002) plane was 50.0 nm. True density obtained by a pycnometer method was 2.23 g/cm$^3$, bulk density was 0.83 g/cm$^3$, and average figure parameter was 10.

Further, the specific surface area obtained by the BET method was 4.4 m$^2$/g. In the particle size distribution obtained by the laser diffraction method, the average particle size was 31.2 μm, cumulative 10% particle size was 12.3 μm, cumulative 50% particle size was 29.5 μm, and cumulative 90% particle size was 53.7 μm. In addition, the breaking strength of graphitized particles obtained by using the Shimadzu micro compression testing machine (produced by Shimadzu Corporation) was 7.0×10$^7$ Pa as an average value.

Then, the graphitized powder of 35 parts by weight and Mg$_2$Si powder of 55 parts by weight as negative active materials were mixed with polyvinylidene fluoride of 10 parts by weight as a binding agent to prepare an anode composite mixture. The anode composite mixture was dispersed in N-methyl pyrrolidone as a solvent to have anode composite mixture slurry. Then, the anode composite mixture slurry was uniformly applied to both the surfaces of an anode current collector layer composed of an elongated copper foil having the thickness of 10 μm to dry the solvent. The anode composite mixture slurry with the solvent dried was compression-molded by a roll press machine to form an anode composite mixture layer. The obtained product was punched out to a disc form having the diameter of 16 mm and manufacture an anode.

Preparation of Nonaqueous Electrolyte Solution

LiPF$_6$ as electrolyte salt was dissolved in the mixed solvent of propylene carbonate of 50 volume % and diethyl carbonate of 50 volume % at the rate of 1.0 mol/l to prepare nonaqueous electrolyte solution.

The cathode, the anode and the nonaqueous electrolyte solution produced as described above were used to manufacture a coin type nonaqueous electrolyte secondary battery as described below. Initially, the anode was accommodated in an anode can made of stainless steel, the nonaqueous electrolyte solution was injected into the anode can, and then, a separator made of microporous polypropylene and having the thickness of 50 μm was disposed on the anode. Then, after the cathode was arranged on the separator to inject the nonaqueous electrolyte solution, a cathode can having a three-layer structure composed of aluminum, stainless steel and nickel was caulked with the anode can and fixed through a sealing gasket made of polypropylene so that the coil type nonaqueous electrolyte secondary battery having the outside diameter of 20 mm and height of 1.6 mm was obtained.

Sample 16 to Sample 22

A coin type nonaqueous secondary battery was manufactured in the same manner as that of the sample 15 except that the remaining amount of Li$_2$CO$_3$ and the average specific surface area of the positive active material were changed as illustrated in Table 3 shown below.

A charging and discharging test as described below was carried out for the nonaqueous electrolyte secondary batteries of the Samples 15 to 22 manufactured as mentioned above to evaluate cyclic characteristics and load characteristics. Firstly, charging and discharging operations were performed in a constant temperature vessel of 23° C. and then, an initial discharging capacity was obtained. At this time, the charging operation of constant-current of 1 mA was carried out until battery voltage reached 4.2 V, and then, the charging operation of constant-voltage of 4.2 V was carried out until the total of charging time reached 1.5 hours. A discharging operation of constant-current of 5 mA was carried out until finish voltage (cut-off voltage) of 3.0 V. The above described process was taken to be one cycle and the charging and discharging operations were carried out 200 times. Capacity ratio (%) indicating the percentage of the discharging capacity of a 200th cycle relative to the discharging capacity of 2nd cycle was obtained. Then, the cyclic characteristics were evaluated from the capacity ratio.

Subsequently, after the charging operation of constant-current of 1 mA was carried out until the battery voltage reached 4.2 V, the discharging capacity under 0.1 C was measured, and further, the discharging capacity under 2 C was measured. Then, the capacity ratio (%) of the 4 C discharging capacity relative to the 0.1 C discharging capacity was obtained to evaluate the load characteristics on the basis of the capacity ratio.

The above-described measurement results are shown in the Table 3 as well as the remaining amount of Li$_2$CO$_3$ and the average specific surface area of the positive active material.

TABLE 3

| | Positive active material | | | |
|---|---|---|---|---|
| | Average Specific Surface Area (m$^2$/g) | Remaining Amount of Li$_2$Co$_3$ (%) | Cyclic Characteristics Capacity Ratio (%) | Load Characteristics Capacity Ratio (%) |
| Sample 15 | 1.5 | 0.5 | 83.7 | 88.2 |
| Sample 16 | 1.0 | 0.5 | 83.1 | 87.5 |
| Sample 17 | 0.2 | 0.5 | 81.9 | 86.4 |
| Sample 18 | 1.0 | 5.0 | 82.5 | 87.1 |
| Sample 19 | 2.0 | 0.5 | 63.2 | 88.4 |
| Sample 20 | 0.1 | 0.5 | 81.7 | 82.1 |
| Sample 21 | 1.0 | 10.0 | 82.2 | 76.4 |
| Sample 22 | 0.1 | 10.0 | 74.4 | 64.3 |

As apparent from the Table 3, the nonaqueous electrolyte secondary batteries of the Samples 15 to 18 are excellent in their cyclic characteristics and load characteristics. On the other hand, the nonaqueous electrolyte secondary battery of the Sample 19 is extremely inferior in its cyclic characteristics and the nonaqueous electrolyte secondary battery of the Sample 20 is slightly inferior in its load characteristics.

Further, the nonaqueous electrolyte secondary battery of the Sample 21 in which the amount of Li$_2$CO$_3$ remaining in the positive active material exceeds 0.5 wt % is good in its cyclic characteristics, but is outstandingly bad in its load characteristics, so that the battery of the Sample 21 is not practical. Still further, the nonaqueous electrolyte secondary battery of the Sample 22 in which the average specific surface area of the positive active material is smaller than 0.2 m$^2$/g and the remaining amount of Li$_2$CO$_3$ exceeds 5.0 wt % relative to all the weight of the positive active material is bad in both cyclic characteristics and load characteristics, and accordingly, the battery of the Sample 22 is not practically employed.

Therefore, it was recognized that the average specific surface area of the positive active material included in the cathode was 0.2 m²/g or larger and 1.5 m²/g or smaller and the remaining amount of $Li_2CO_3$ was 5.0 wt % or lower relative to all the weight of the positive active material so that the nonaqueous electrolyte secondary battery excellent in its cyclic characteristics could be obtained. Further, it was understood that the average specific surface area and the remaining amount of $Li_2CO_3$ of the positive active material were prescribed to the above-described ranges so that the practical nonaqueous electrolyte secondary battery excellent in its load characteristics, capable of maintaining the stable structure of the active material and having a large capacity and excellent cyclic characteristics could be realized.

Experiment 4-2

In the Experiment 4-2, the negative active materials having different average specific surface areas were used to manufacture nonaqueous electrolyte secondary batteries and evaluate the difference in battery characteristics of the nonaqueous electrolyte secondary batteries due to the difference in the average specific surface areas of the negative active materials. In this connection, the average specific surface area is obtained by multiplying the specific surface area of each of one more kinds of materials employed as the negative active materials by the rate of weight of each material and adding together the respective values thus obtained. The average specific surface area of the negative active material is controlled by suitably adjusting pulverizing conditions and classifying conditions upon mixing the materials included in the negative active material.
Samples 23 to 29

A coin type nonaqueous secondary battery was manufactured in the same manner as that of the sample 15 except that only a carbon material (graphitized powder) was used as the negative active material and the average specific surface area of the negative active material was respectively illustrated in Table 4 as shown below.

A charging and discharging test as described below was carried out for the nonaqueous electrolyte secondary batteries of the Samples 23 to 29 manufactured as mentioned above to measure initial capacity and self-discharge rate. The charging operation of constant-current of 1 mA was carried out until battery voltage reached 4.2 V, and then, the charging operation of constant-voltage of 4.2 V was carried out until the total of charging time reached 1.5 hours. A discharging operation of constant-current of 5 mA was carried out until finish voltage (cut-off voltage) of 3.0 V. The above described charging and discharging operation cycles were carried out to obtain an initial capacity.

Then, the charging and discharging cycles were repeated 10 times to measure a discharging capacity upon discharge of a 10th cycle and take this discharging capacity to be a capacity before storage. Then, the charging operation of charging current of 1 mA and finish voltage of 4.2 V was carried out. Thus, the battery was left under the environment of the temperature of 23° C. for 30 days. After the battery was left for 30 days, a discharging operation of discharging current of 1 mA was carried out until the finish voltage of 3.0 V to measure the discharging capacity and take this discharging capacity to be a capacity after storage. Assuming that the capacity before storage is a and the capacity after storage is b, the self-discharge rate (%) expressed by 100×(a−b)/a was calculated.

The above-described measurement results are shown in the Table 4 as well as the average specific surface area of the negative active material.

TABLE 4

| | Negative Active Material | | | | |
|---|---|---|---|---|---|
| | Carbon Base (wt %) | Alloy Base (wt %) | Average Specific Surface Area (m²/g) | Initial Capacity (Wh/l) | Self-discharge Rate (%) |
| Sample 23 | 100 | 0 | 0.5 | 153 | 13.2 |
| Sample 24 | 100 | 0 | 2.3 | 200 | 15.5 |
| Sample 25 | 100 | 0 | 4.6 | 211 | 18.0 |
| Sample 26 | 100 | 0 | 6.3 | 202 | 21.8 |
| Sample 27 | 100 | 0 | 8.5 | 195 | 27.2 |
| Sample 28 | 100 | 0 | 10.8 | 183 | 35.0 |
| Sample 29 | 100 | 0 | 33.2 | 157 | 35.9 |

As apparent from the Table 4, as the average specific surface area of the negative active material is increased, the self-discharge rate is increased. Especially, it is understood that when the average specific surface area of the negative active material exceeds 10 m²/g, the self-discharge rate exceeds 35% which is a practical limit. Further, it is understood that when the average specific surface area of the negative active material is 0.5 m²/g or lower, the initial capacity is considerably lowered.

Accordingly, it was understood that the nonaqueous electrolyte secondary battery had the negative active material whose average specific surface area was 0.5 m²/g or larger and 10 m²/g or smaller so that the battery was high in its initial capacity and excellent in its self-discharge rate.
Samples 30 to 36

A coin type nonaqueous electrolyte secondary battery was manufactured in the same manner as that of the Sample 15 except that the mixed powder of a carbon material (graphitized powder) of 80 parts by weight and alloy powder ($Mg_2Si$ powder) of 20 parts by weight was used as an negative active material and the average specific surface area of the negative active material was respectively illustrated in Table 5 as shown below.
Samples 37 to 43

A coin type nonaqueous electrolyte secondary battery was manufactured in the same manner as that of the Sample 15 except that the mixed powder of a carbon material (graphitized powder) of 50 parts by weight and alloy powder ($Mg_2Si$ powder) of 50 parts by weight was used as an negative active material and the average specific surface area of the negative active material was respectively illustrated in Table 5 as shown below.
Samples 44 to 50

A coin type nonaqueous electrolyte secondary battery was manufactured in the same manner as that of the Sample 15 except that the mixed powder of a carbon material (graphitized powder) of 20 parts by weight and alloy powder ($Mg_2Si$ powder) of 80 parts by weight was used as an negative active material and the average specific surface area of the negative active material was respectively illustrated in Table 5 as shown below.
Samples 51 to 57

A coin type nonaqueous electrolyte secondary battery was manufactured in the same manner as that of the Sample 15 except that only alloy powder ($Mg_2Si$ powder) was used as an negative active material and the average specific surface area of the negative active material was respectively illustrated in Table 5 as shown below.

The above-described charging and discharging test was likewise carried out for the nonaqueous electrolyte secondary batteries of the Samples 30 to 57 manufactured as mentioned above to measure the initial capacity and the self-discharge rate.

The above measurement results are shown in the Table 5 as well as the average specific surface area of the negative active material.

TABLE 5

| | Negative Active Material | | | |
|---|---|---|---|---|
| | Carbon Base (wt %) | Alloy Base (wt %) | Average Specific Surface Area ($m^2/g$) | Initial Capacity (Wh/l) | Self-discharge Rate (%) |
| Sample 30 | 80 | 20 | 0.5 | 188 | 14.0 |
| Sample 31 | 80 | 20 | 2.3 | 240 | 16.3 |
| Sample 32 | 80 | 20 | 4.6 | 250 | 19.8 |
| Sample 33 | 80 | 20 | 6.3 | 233 | 23.7 |
| Sample 34 | 80 | 20 | 8.5 | 225 | 29.0 |
| Sample 35 | 80 | 20 | 10.8 | 211 | 35.0 |
| Sample 36 | 80 | 20 | 33.2 | 186 | 36.7 |
| Sample 37 | 50 | 50 | 0.5 | 232 | 14.1 |
| Sample 38 | 50 | 50 | 2.3 | 291 | 17.0 |
| Sample 39 | 50 | 50 | 4.6 | 305 | 22.0 |
| Sample 40 | 50 | 50 | 6.3 | 289 | 27.5 |
| Sample 41 | 50 | 50 | 8.5 | 281 | 32.5 |
| Sample 42 | 50 | 50 | 10.8 | 250 | 36.9 |
| Sample 43 | 50 | 50 | 33.2 | 222 | 40.9 |
| Sample 44 | 20 | 80 | 0.5 | 279 | 15.0 |
| Sample 45 | 20 | 80 | 2.3 | 340 | 17.0 |
| Sample 46 | 20 | 80 | 4.6 | 355 | 25.5 |
| Sample 47 | 20 | 80 | 6.3 | 338 | 33.0 |
| Sample 48 | 20 | 80 | 8.5 | 332 | 34.9 |
| Sample 49 | 20 | 80 | 10.8 | 290 | 36.9 |
| Sample 50 | 20 | 80 | 33.2 | 250 | 43.0 |
| Sample 51 | 0 | 100 | 0.5 | 311 | 16.2 |
| Sample 52 | 0 | 100 | 2.3 | 367 | 18.1 |
| Sample 53 | 0 | 100 | 4.6 | 383 | 25.3 |
| Sample 54 | 0 | 100 | 6.3 | 376 | 33.4 |
| Sample 55 | 0 | 100 | 8.5 | 373 | 34.9 |
| Sample 56 | 0 | 100 | 10.8 | 322 | 40.3 |
| Sample 57 | 0 | 100 | 33.2 | 277 | 44.8 |

As apparent from the Table 5, as the rate occupied by the alloy powder employed as the negative active material is increased, the initial capacity is increased, which is practically preferable. Further, it is understood that as the average specific surface area of the negative active material is increased, the self-discharge rate is increased. Especially, it is understood that when the average specific surface area of the negative active material exceeds 10 $m^2/g$, the self-discharge rate exceeds 35% which is a practical limit. Further, it is understood that when the average specific surface area of the negative active material is 0.5 $m^2/g$ or lower, the initial capacity is decreased.

Accordingly, it was understood that the nonaqueous electrolyte secondary battery had the negative active material whose average specific surface area was 0.5 $m^2/g$ or larger and 10 $m^2/g$ or smaller so that the battery was high in its initial capacity and excellent in its self-discharge rate. Further, it was apparent that when the negative active material in which the rate occupied by the alloy powder was high was more employed, the nonaqueous electrolyte secondary battery showing excellent cyclic characteristics and the more excellent in its initial capacity and self-discharge rate could be obtained.

Example 5

Experiment 5-1

Then, was carried out an experiment concerning the relation between the volume density of the cathode composite mixture layer and the cyclic characteristics. The results of the experiment are shown below. When this experiment was carried out, batteries for tests were manufactured as described below. The compositions of cathode composite mixtures and anode composite mixtures employed as samples are respectively described below.

A cathode composite mixture 1 was prepared in such a manner that a mixed material obtained by mixing $LiNi_{0.8}Co_{0.2}O_2$ of 17.2 parts by weight with $LiMn_{1.9}Cr_{0.1}O_4$ of 68.8 parts by weight was used as a positive active material and a conductive agent of 10 parts by weight and a binding agent (polyvinylidene fluoride; PVdF) of 4 parts by weight were added to the mixed material. A cathode composite mixture 2 was prepared in such a manner that a mixed material obtained by mixing $LiNi_{0.8}Co_{0.2}O_2$ of 43 parts by weight with $LiMn_{1.9}Cr_{0.1}O_4$ of 43 parts by weight was used as a positive active material and a conductive agent of 10 parts by weight and a binding agent (PVdF) of 4 parts by weight were added to the mixed material. A cathode composite mixture 3 was prepared in such a manner that a mixed material obtained by mixing $LiNi_{0.8}Co_{0.2}O_2$ of 68.8 parts by weight with $LiMn_{1.9}Cr_{0.1}O_4$ of 17.2 parts by weight was used as a positive active material and a conductive agent of 10 parts by weight and a binding agent (PVdF) of 4 parts by weight were added to the mixed material.

Further, an anode composite mixture 1 was prepared in such a manner that artificial graphite of 90 parts by weight was used as an negative active material and a binding agent (PVdF) of 10 parts by weight was added to the artificial graphite. An anode composite mixture 2 was prepared in such a manner that $Mg_2Si$ powder of 90 parts by weight was used as an negative active material and a binding agent (PVdF) of 10 parts by weight was added to the $Mg_2Si$ powder. An anode composite mixture 3 was prepared in such a manner that a mixed material obtained by mixing artificial graphite of 55 parts by weight with $Mg_2Si$ powder of 35 parts by weight was used as an negative active material and a binding agent (PVdF) of 10 parts by weight was added to the mixed material.

Sample 60

Firstly, a cathode material was produced as described below. The cathode composite mixture 1 was applied to both the surfaces of an aluminum foil serving as a cathode current collector to form a cathode composite mixture layer. Then, a pressing treatment was performed so that the volume density of the cathode composite mixture layer was 2.5 $g/cm^3$ to manufacture the cathode material.

Then, an anode material was manufactured as described below. The anode composite mixture 1 was applied to both the surfaces of a copper foil serving as an anode current collector and a pressing treatment was performed similarly to the cathode material to manufacture the anode material. The cathode material and the anode material obtained in such a manner were allowed to come into tight contact with each other through a separator made of a microporous polypropylene film. Thus, the obtained member was coiled many times in a spiral form to manufacture a battery element.

Then, an insulating plate was inserted into the bottom part of a battery can made of iron whose inside is plated with nickel in the same manner as that of the above-described battery, and further, the battery element was accommodated in the battery can. Then, in order to collect the current of an anode, one end of an anode lead made of nickel was stuck to the anode and the other end was welded to the battery can. Further, in order to collect the current of a cathode, one end of a cathode lead made of aluminum was stuck to the cathode and the other end was electrically connected to a cover body through a current cutting-off thin plate. Then, nonaqueous electrolyte solution was injected into the battery can to impregnate the above-described separator therewith. The nonaqueous electrolyte solution was prepared by dissolving $LiPF_6$ as an electrolyte in the mixed solvent of propylene carbonate of 50 volume % and dimethoxyethane of 50 volume % so as to have the concentration of 1.0 mol/l. Finally, the battery can was caulked through a gasket to which asphalt was applied to fix the cover body thereto and manufacture the cylindrical battery for the test.

Sample 61 to Sample 68

Batteries for tests were respectively manufactured in the same manner as that of the Sample 60 except that each cathode composite mixture illustrated in Table 6 shown below was used and a cathode material was produced by likewise performing a pressing treatment so as to have volume density shown in the Table 6.

Sample 69 to Sample 74

Batteries for tests were respectively manufactured in the same manner as that of the Sample 60 except that each cathode composite mixture illustrated in Table 6 shown below was used and a cathode material was produced by similarly performing a pressing treatment so as to have volume density shown in the Table 6.

Sample 75 to Sample 83

Batteries for tests were respectively manufactured in the same manner as that of the Sample 60 except that the anode composite mixture 2 was used, each cathode composite mixture illustrated in Table 7 shown below was used and a cathode material was produced by similarly performing a pressing treatment so as to have volume density shown in the Table 7.

Sample 84 to Sample 89

Batteries for tests were respectively manufactured in the same manner as that of the Sample 60 except that the anode composite mixture 2 was used, each cathode composite mixture illustrated in Table 7 shown below was used and a cathode material was produced by similarly carrying out a pressing treatment so as to have volume density shown in the Table 7.

Sample 90 to Sample 98

Batteries for tests were respectively manufactured in the same manner as that of the Sample 60 except that the anode composite mixture 3 was used, each cathode composite mixture illustrated in Table 8 shown below was used and a cathode material was produced by similarly performing a pressing treatment so as to have volume density shown in the Table 8.

Sample 99 to Sample 104

Batteries for tests were respectively manufactured in the same manner as that of the Sample 60 except that the anode composite mixture 3 was used, each cathode composite mixture illustrated in Table 8 shown below was used and a cathode material was produced by performing a pressing treatment so as to have volume density shown in the Table 8.

The cyclic characteristics of the respective batteries for the tests of the Samples 60 to 74 manufactured as described above were evaluated. As for the cyclic characteristics of each battery for the test, a charging operation of constant-current of 1 A was carried out in a constant temperature vessel of 23° C. until battery voltage reached 4.2 V, and then, a discharging operation of constant-current of 0.5 A was carried out until finish voltage reached 3.5 V. The above-described charging and discharging operation cycles were repeated 100 times to obtain the rate (capacity maintaining/retention ratio) of a discharging capacity of a 100th cycle relative to a discharging capacity of a 2nd cycle. This value was determined to be an object to be evaluated. These results are shown in the Table 6, the Table 7 and the Table 8.

TABLE 6

|  | Cathode Composite Mixture | Cathode Electrode Density (g/cm$^3$) | Capacity Maintaining/ Retention Ratio (%) |
|---|---|---|---|
| Sample 60 | 1 | 2.5 | 91 |
| Sample 61 | 2 | 2.5 | 92 |
| Sample 62 | 3 | 2.5 | 92 |
| Sample 63 | 1 | 3.0 | 89 |
| Sample 64 | 2 | 3.0 | 90 |
| Sample 65 | 3 | 3.0 | 89 |
| Sample 66 | 1 | 3.3 | 86 |
| Sample 67 | 2 | 3.3 | 88 |
| Sample 68 | 3 | 3.3 | 87 |
| Sample 69 | 1 | 2.3 | 79 |
| Sample 70 | 2 | 2.3 | 79 |
| Sample 71 | 3 | 2.3 | 77 |
| Sample 72 | 1 | 3.5 | 71 |
| Sample 73 | 2 | 3.5 | 72 |
| Sample 74 | 3 | 3.5 | 72 |

TABLE 7

|  | Cathode Composite Mixture | Cathode Electrode Density (g/cm$^3$) | Capacity Maintaining/ Retention Ratio (%) |
|---|---|---|---|
| Sample 75 | 1 | 2.5 | 86 |
| Sample 76 | 2 | 2.5 | 87 |
| Sample 77 | 3 | 2.5 | 88 |
| Sample 78 | 1 | 3.0 | 84 |
| Sample 79 | 2 | 3.0 | 85 |
| Sample 80 | 3 | 3.0 | 85 |
| Sample 81 | 1 | 3.3 | 83 |
| Sample 82 | 2 | 3.3 | 84 |
| Sample 83 | 3 | 3.3 | 84 |
| Sample 84 | 1 | 2.3 | 73 |
| Sample 85 | 2 | 2.3 | 71 |
| Sample 86 | 3 | 2.3 | 74 |
| Sample 87 | 1 | 3.5 | 66 |
| Sample 88 | 2 | 3.5 | 68 |
| Sample 89 | 3 | 3.5 | 68 |

TABLE 8

|  | Cathode Composite Mixture | Cathode Electrode Density (g/cm$^3$) | Capacity Maintaining/ Retention Ratio (%) |
|---|---|---|---|
| Sample 90 | 1 | 2.5 | 89 |
| Sample 91 | 2 | 2.5 | 92 |
| Sample 92 | 3 | 2.5 | 90 |
| Sample 93 | 1 | 3.0 | 86 |
| Sample 94 | 2 | 3.0 | 86 |
| Sample 95 | 3 | 3.0 | 86 |
| Sample 96 | 1 | 3.3 | 85 |
| Sample 97 | 2 | 3.3 | 86 |
| Sample 98 | 3 | 3.3 | 84 |
| Sample 99 | 1 | 2.3 | 74 |
| Sample 100 | 2 | 2.3 | 74 |
| Sample 101 | 3 | 2.3 | 72 |
| Sample 102 | 1 | 3.5 | 69 |

TABLE 8-continued

|  | Cathode Composite Mixture | Cathode Electrode Density (g/cm³) | Capacity Maintaining/ Retention Ratio (%) |
|---|---|---|---|
| Sample 103 | 2 | 3.5 | 70 |
| Sample 104 | 3 | 3.5 | 70 |

As shown in each of the above-described Tables, while any battery for the test of each Example to which the pressing treatment is applied so that the volume density of the cathode composite mixture layer of the cathode material is 2.5 g/cm³ to 3.3 g/cm³ has a capacity maintaining/retention ratio as high as 80% or more, any of the batteries for the tests of the Samples 69 to 71, the Samples 84 to 86 and the Samples 99 to 101 to which the pressing treatment is applied so that the volume density of the cathode composite mixture layer is 2.3 g/cm³ lower than those of other Examples shows the value of the capacity maintaining/retention ratio lower than those of other Samples.

This phenomenon is considered to be generated, because the contact between the cathode composite mixture layer and the cathode current collector is deteriorated as the charging and discharging cycles advance. Further, each of batteries for the tests of the Samples 72 to 76, the Samples 87 to 89 and the Samples 102 to 104 in which the pressing treatment is performed so that the volume density of the cathode composite mixture layer is 3.5 g/cM³ higher than those of other Examples shows the value of the capacity maintaining/retention ratio lower than those of other Examples. This phenomenon is considered to be generated, because the cathode material is deformed due to the influence of the expansion and contraction of the cathode composite mixture layer generated upon charging and discharging operations.

As apparent from the above-described results, even when any of a carbon material, an alloy material, and the mixed material of the carbon material and the alloy material is employed for the anode, the cathode material is manufactured so that the volume density of the cathode composite mixture layer ranges from 2.5 g/cm³ to 3.3 g/cm³ and accordingly, can be obtained a nonaqueous electrolyte secondary battery in which the stable structure of an active material is maintained and charging and discharging characteristics are improved with large capacity.

Then, was carried out an experiment concerning the relation between the porosity of the cathode composite mixture layer and the cyclic characteristics. When this experiment was carried out, batteries for tests were manufactured as described below.

Sample 105 to Sample 113

Batteries for tests were respectively manufactured in the same manner as that of the Sample 60 except that each cathode composite mixture illustrated in Table 9 shown below was used and a cathode material was produced by likewise performing a pressing treatment so as to have porosity in the Table 9.

Sample 114 to Sample 119

Batteries for tests were respectively manufactured in the same manner as that of the Sample 60 except that each cathode composite mixture illustrated in Table 9 shown below was used and a cathode material was produced by similarly performing a pressing treatment so as to have porosity shown in the Table 9.

Sample 120 to Sample 128

Batteries for tests were respectively manufactured in the same manner as that of the Sample 60 except that the anode composite mixture 2 was used, each cathode composite mixture illustrated in Table 10 shown below was used, and a cathode material was produced by similarly performing a pressing treatment so as to have porosity shown in the Table 10.

Sample 129 to Sample 134

Batteries for tests were respectively manufactured in the same manner as that of the Sample 60 except that the anode composite mixture 2 was used, each cathode composite mixture illustrated in Table 10 shown below was used, and a cathode material was produced by similarly carrying out a pressing treatment so as to have porosity shown in the Table 10.

Sample 135 to Sample 143

Batteries for tests were respectively manufactured in the same manner as that of the Sample 60 except that the anode composite mixture 3 was used, each cathode composite mixture illustrated in Table 11 shown below was used, and a cathode material was produced by similarly performing a pressing treatment so as to have porosity shown in the Table 11.

Sample 144 to Sample 149

Batteries for tests were respectively manufactured in the same manner as that of the Sample 60 except that the anode composite mixture 3 was used, each cathode composite mixture illustrated in Table 11 shown below was used, and a cathode material was produced by performing a pressing treatment so as to have porosity shown in the Table 11.

The cyclic characteristics of the batteries for the tests of the Samples 105 to 149 manufactured as mentioned above were evaluated. These results are shown in the Table 9, the Table 10 and the Table 11.

TABLE 9

|  | Cathode Composite Mixture | Cathode porosity (%) | Capacity Maintaining/ Retention Ratio (%) |
|---|---|---|---|
| Sample 105 | 1 | 20 | 88 |
| Sample 106 | 2 | 20 | 89 |
| Sample 107 | 3 | 20 | 87 |
| Sample 108 | 1 | 30 | 89 |
| Sample 109 | 2 | 30 | 91 |
| Sample 110 | 3 | 30 | 89 |
| Sample 111 | 1 | 40 | 88 |
| Sample 112 | 2 | 40 | 89 |
| Sample 113 | 3 | 40 | 87 |
| Sample 114 | 1 | 15 | 64 |
| Sample 115 | 2 | 15 | 67 |
| Sample 116 | 3 | 15 | 65 |
| Sample 117 | 1 | 45 | 78 |
| Sample 118 | 2 | 45 | 77 |
| Sample 119 | 3 | 45 | 78 |

TABLE 10

|  | Cathode Composite Mixture | Cathode porosity (%) | Capacity Maintaining/ Retention Ratio (%) |
|---|---|---|---|
| Sample 120 | 1 | 20 | 86 |
| Sample 121 | 2 | 20 | 88 |
| Sample 122 | 3 | 20 | 86 |
| Sample 123 | 1 | 30 | 85 |
| Sample 124 | 2 | 30 | 86 |
| Sample 125 | 3 | 30 | 86 |
| Sample 126 | 1 | 40 | 84 |
| Sample 127 | 2 | 40 | 88 |

TABLE 10-continued

|  | Cathode Composite Mixture | Cathode porosity (%) | Capacity Maintaining/ Retention Ratio (%) |
|---|---|---|---|
| Sample 128 | 3 | 40 | 86 |
| Sample 129 | 1 | 15 | 62 |
| Sample 130 | 2 | 15 | 63 |
| Sample 131 | 3 | 15 | 59 |
| Sample 132 | 1 | 45 | 65 |
| Sample 133 | 2 | 45 | 67 |
| Sample 134 | 3 | 45 | 67 |

TABLE 11

|  | Cathode Composite Mixture | Cathode porosity (%) | Capacity Maintaining/ Retention Ratio (%) |
|---|---|---|---|
| Sample 135 | 1 | 20 | 87 |
| Sample 136 | 2 | 20 | 89 |
| Sample 137 | 3 | 20 | 89 |
| Sample 138 | 1 | 30 | 88 |
| Sample 139 | 2 | 30 | 91 |
| Sample 140 | 3 | 30 | 89 |
| Sample 141 | 1 | 40 | 86 |
| Sample 142 | 2 | 40 | 88 |
| Sample 143 | 3 | 40 | 87 |
| Sample 144 | 1 | 15 | 64 |
| Sample 145 | 2 | 15 | 66 |
| Sample 146 | 3 | 15 | 63 |
| Sample 147 | 1 | 45 | 69 |
| Sample 148 | 2 | 45 | 71 |
| Sample 149 | 3 | 45 | 70 |

As shown in each of the above-described Tables, while any battery for the test of each Example to which the pressing treatment is applied so that the porosity of the cathode composite mixture layer of the cathode material is 20% to 40% has a capacity maintaining/retention ratio as high as 80% or more, any of the batteries for the tests of the Samples 114 to 116, the Samples 129 to 131, the Samples 144 to 146 to which the pressing treatment is applied so that the porosity of the cathode composite mixture layer is 15% lower than those of other Examples shows the value of the capacity maintaining/retention ratio lower than those of other batteries.

This phenomenon is considered to be generated, because the contact between the cathode composite mixture layer and the cathode current collector is deteriorated as the charging and discharging cycles advance. Further, each of batteries for the tests of the Samples 117 to 119, the Samples 132 to 134 and the Samples 147 to 149 in which the pressing treatment is performed so that the porosity of the cathode composite mixture layer is 45% higher than those of other Examples shows the value of the capacity maintaining/retention ratio lower than other batteries. This phenomenon is considered to be generated, because the cathode material is deformed due to the influence of the expansion and contraction of the cathode composite mixture layer generated upon charging and discharging operations.

As apparent from the above-described results, even when any of a carbon material, an alloy material and the mixed material of the carbon material and the alloy material is employed for the anode, the cathode material is manufactured so that the porosity of the cathode composite mixture layer ranges from 20% to 40%, and accordingly, the cyclic characteristics are improved. As described above, the nonaqueous electrolyte secondary battery according to the present embodiment includes the lithium manganese oxide, so that the battery capacity can become large capacity and the stable structure of the active material can be maintained. Further, the excellent stability is exhibited even under the high temperature.

Although the embodiments to which the present invention is applied are described above, the present invention is not limited thereto and the structures, configurations, dimensions, materials or the like of the batteries may be arbitrarily changed within a scope of the invention without departing the gist of the present invention.

INDUSTRIAL APPLICABILITY

According to the present invention, a positive active material includes a compound expressed by a general formula $Li_mM_xM'_yM''_zO_2$ (here, M designates at least one kind of element selected from Co, Ni and Mn, M' designates at least one kind of element selected from Al, Cr, V, Fe, Cu, Zn, Sn, Ti Mg, Sr, B, Ga, In, Si and Ge, and M'' designates at least one kind of element selected from Mg, Ca, B and Ga. Further, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$). Accordingly, the structural stability of the positive active material is maintained even under an overcharged state.

Further, according to the present invention, a nonaqueous electrolyte secondary battery includes a cathode having a positive active material; an anode having an negative active material and a nonaqueous electrolyte, and the positive active material includes a compound expressed by a general formula $Li_mM_xM'_yM''_zO_2$ (here, M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M'' designates at least one kind of element selected from Mg, Ca, B and Ga. Further, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$). Accordingly, the structural stability of the positive active material can be maintained even under an overcharged state and the rise of temperature of the battery can be suppressed.

Further, according to the present invention, an excellent electrode performance and the performances of the nonaqueous electrolyte secondary battery can be realized without including addition materials which do not contribute to the charging and discharging reactions and the excellent charging and discharging cyclic performance and storage performance with large capacity can be compatible with the suppression of the rise of temperature of the battery upon overcharging.

Furthermore, according to the present invention, the lithium transition metals are mixed with composite oxides and the mixture is utilized, so that a new active material having a stable structure and large capacity and excellent in its stability under high temperature can be provided.

What is claimed is:

1. A nonaqueous electrolyte secondary battery comprising:
a cathode including a positive active material;
an anode including a negative active material; and
a nonaqueous electrolyte,
wherein,
the positive active material includes a compound expressed by a general formula $Li_mM_xM'_yM''_zO_2$, where M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M'' designates at least one kind of element selected from Mg, Ca, B and Ga, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$, the positive active material includes lithium manganese oxide expressed by a general formula $Li_sMn_{2-t}Ma_tO_4$, where s is designated by an expression of $0.9 \leq s$, the value of t is located within a range expressed by $0.01 \leq t \leq 0.5$, and Ma includes one or a plurality of elements between Fe, Co, Ni, Cu, Zn, Al, Sn, Cr, V, Ti, Mg, Ca, Sr, B, Ga, In, Si and Ge, the negative active material includes at least one or more kinds of materials between lithium metals, lithium alloys, or materials capable of doping or dedoping lithium, and the average specific surface area of the negative active material is $0.5 \text{ m}^2/\text{g}$ or more and $10 \text{ m}^2/\text{g}$ or less.

2. A nonaqueous electrolyte secondary battery comprising:
a cathode including a positive active material;
an anode including a negative active material; and
a nonaqueous electrolyte,
wherein, the positive active material includes a compound expressed by a general formula $Li_mM_xM'_yM''_zO_2$, where M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M" designates at least one kind of element selected from Mg, Ca, B and Ga, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$, and the positive active material includes manganese-containing oxides having at least one kind of first element selected from a group having lithium, manganese, metal elements except manganese and boron and oxygen, the mole ratio of the first element relative to the manganese 'first element/manganese' being located within a range of 0.01/1.99 or more and 0.5/1.5 or less, and nickel-containing oxides including at least one kind of second element selected from a group having lithium, nickel and metal elements except nickel and boron and oxygen, the mole ratio of the second element relative to the nickel 'second element/nickel' being located within a range of 0.01/0.99 or more and 0.5/0.5 or less, the negative active material includes at least one or more kinds of materials between lithium metals, lithium alloys, or materials capable of being doped with or dedoped from lithium, and the average specific surface area of the positive active material is $0.2 \text{ m}^2/\text{g}$ or larger and $1.5 \text{ m}^2/\text{g}$ or smaller and the amount of $Li_2CO_3$ remaining in the positive active material is 5.0 wt % or lower relative to all the weight of the positive active material.

3. The nonaqueous secondary battery according to claim 2, wherein the mixture ratio of the manganese-containing oxides to the nickel-containing oxides in the positive active material is respectively in the mass ratio of 10 to 80 to 90 to 20.

4. A nonaqueous electrolyte secondary battery comprising:
a cathode including a positive active material;
an anode including a negative active material; and
a nonaqueous electrolyte,
wherein, the positive active material includes a compound expressed by a general formula $Li_mM_xM'_yM''_zO_2$, where M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M" designates at least one kind of element selected from Mg, Ca, B and Ga, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$, the positive active material includes manganese-containing oxides having at least one kind of first element selected from a group having lithium, manganese, metal elements except manganese and boron and oxygen, the mole ratio of the first element relative to the manganese 'first element/manganese' being located within a range of 0.01/1.99 or more and 0.5/1.5 or less, and nickel-containing oxides including at least one kind of second element selected from a group having lithium, nickel and metal elements except nickel and boron and oxygen, the mole ratio of the second element relative to the nickel 'second element/nickel' being located within a range of 0.01/0.99 or more and 0.5/0.5 or less, the negative active material includes at least one or more kinds of materials between lithium metals, lithium alloys, or materials capable of being doped with or dedoped from lithium, and the average specific surface area of the negative active material is $0.5 \text{ m}^2/\text{g}$ or more and $10 \text{ m}^2/\text{g}$ or less.

5. The nonaqueous secondary battery according to claim 4, wherein the mixture ratio of the manganese-containing oxides to the nickel-containing oxides is respectively in the mass ratio of 10 to 80 to 90 to 20.

6. A nonaqueous electrolyte secondary battery comprising:
a cathode including a positive active material;
an anode including a negative active material; and
a nonagueous electrolyte,
wherein, the positive active material includes a compound expressed by a general formula $Li_mM_x,M'_yM''_zO_2$, where M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M" designates at least one kind of element selected from Mg, Ca, B and Ga, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$, and the positive active material includes a mixed material obtained by mixing lithium manganese oxide expressed by a general formula $Li_sMn_{2-t}Ma_tO_4$, where the value of x is expressed by $0.9 \leq s$, the value of t is located within a range expressed by $0.01 \leq t \leq 0.5$, and Ma indicates one or a plurality of elements between Fe, Co, Ni, Cu, Zn, Al, Sn, Cr, V, Ti, Mg, Ca, Sr, B, Ga, In, Si and Ge, and lithium nickel oxide expressed by a general formula $LiNi_{1-u}Mb_uO_2$, where the value of u is located within a range expressed by $0.01 \leq u \leq 0.5$ and Mb indicates one or a plurality of elements between Fe, Co, Mn, Cu, Zn, Al, Sn, Cr, V, Ti, Mg, Ca, Sr, B, Ga, In, Si and Ge in the mass ratio the lithium manganese oxide of 10 wt % to 80 wt % to lithium nickel oxide of 90 wt % to 20 wt %, the negative active material includes at least one or more kinds of materials between lithium metals, lithium alloys, or material capable of doping and dedoping lithium, and the volume density of a cathode composite mixture layer including the positive active material ranges from 2.5 g/cm³ to 3.3 g/cm³.

7. The nonaqueous electrolyte secondary battery according to claim 6, wherein the cathode composite mixture layer is formed by coating both the surfaces of an elongated electrode current collector with a cathode composite mixture obtained by mixing the positive active material, a conductive agent and a binding agent together.

8. A nonaqueous electrolyte secondary battery comprising:
a cathode including a positive active material;
an anode including a negative active material; and
a nonaqueous electrolyte,
wherein,
the positive active material includes a compound expressed by a general formula $Li_mM_xM'_yM''_zO_2$, where M designates at least one kind of element selected from Co, Ni and Mn, M' designates at least one kind of element selected from Al, Cr, V, Fe, Cu, Zn, Sn, Ti, Mg, Sr, B, Ga, In, Si and Ge, and M'' designates at least one kind of element selected from Mg, Ca, B and Ga, x is designated by an expression of $0.9 \leq x < 1$, y is indicated by an expression of $0.001 \leq y \leq 0.5$, z is indicated by an expression of $0 \leq z \leq 0.5$, and m is indicated by an expression of $0.5 \leq m$, and the positive active material includes a mixed material obtained by mixing lithium manganese oxide expressed by a general formula $Li_sMn_{2-t}Ma_tO_4$, where the value of x is expressed by $0.9 \leq s$, the value of t is located within a range expressed by $0.01 \leq t \leq 0.5$, and Ma indicates one or a plurality of elements between Fe, Co, Ni, Cu, Zn, Al, Sn, Cr, V, Ti, Mg, Ca, Sr, B, Ga, In, Si and Ge, and lithium nickel oxide expressed by a general formula $LiNi_{1-u}Mb_uO_2$, where the value of u is located within a range expressed by $0.01 \leq u \leq 0.5$ and Mb indicates one or a plurality of elements between Fe, Co, Mn, Cu, Zn, Al, Sn, Cr, V, Ti, Mg, Ca, Sr, B, Ga, In, Si and Ge, in the mass ratio the lithium manganese oxide of 10 wt % to 80 wt % to lithium nickel oxide of 90 wt % to 20 wt %,
the negative active material includes at least one or more kinds of materials between lithium metals, lithium alloys, or materials capable of doping and dedoping lithium, and
the percentage of porosity of a cathode composite mixture layer including the positive active material ranges from 20% to 40%.

9. The nonaqueous electrolyte secondary battery according to claim 8, wherein the cathode composite mixture layer is formed by coating both the surfaces of an elongated electrode current collector with a cathode composite mixture obtained by mixing the positive active material, a conductive agent and a binding agent together.

10. The nonaqueous electrolyte secondary battery according to claim 1, wherein,
the average specific surface area of the positive active material is 0.2 m²/g or larger and 1.5 m²/g or smaller, and
the amount of $Li_2CO_3$ remaining in the positive active material is 5.0 wt % or lower relative to all the weight of the positive active material.

11. The nonaqueous electrolyte secondary battery according to claim 1, further comprising:
a cathode composite mixture layer including the positive active material having a volume density from 2.5 g/cm³ to 3.3 g/cm³.

12. The nonaqueous electrolyte secondary battery according to claim 1, further comprising:
a cathode composite mixture layer including the positive active material having a porosity from 20% to 40%.

13. The nonaqueous electrolyte secondary battery according to claim 1, further comprising:
cathode composite mixture layers on both surfaces of an elongated electrode current collector, the cathode composite mixture layers including (i) the positive active material, (ii) a conductive agent, and (iii) a binding agent.

14. The nonaqueous secondary battery according to claim 2, wherein the average specific surface area of the negative active material is 0.5 m²/g or more and 10 m²/g or less.

15. The nonaqueous secondary battery according to claim 2, further comprising:
a cathode composite mixture layer including the positive active material having a volume density from 2.5 g/cm³ to 3.3 g/cm³.

16. The nonaqueous secondary battery according to claim 2, further comprising:
a cathode composite mixture layer including the positive active material having a porosity from 20% to 40%.

17. The nonaqueous secondary battery according to claim 2, further comprising:
cathode composite mixture layers on both surfaces of an elongated electrode current collector, the cathode composite mixture layers including (i) the positive active material, (ii) a conductive agent, and (iii) a binding agent.

18. The nonaqueous electrolyte secondary battery according to claim 6, wherein,
the average specific surface area of the positive active material is 0.2 m²/g or larger and 1.5 m²/g or smaller, and
the amount of $Li_2CO_3$ remaining in the positive active material is 5.0 wt % or lower relative to all the weight of the positive active material.

19. The nonaqueous electrolyte secondary battery according to claim 6, wherein the average specific surface area of the negative active material is 0.5 m²/g or more and 10 m²/g or less.

20. The nonaqueous electrolyte secondary battery according to claim 8, wherein,
the average specific surface area of the positive active material is 0.2 m²/g or larger and 1.5 m²/g or smaller, and
the amount of $Li_2CO_3$ remaining in the positive active material is 5.0 wt % or lower relative to all the weight of the positive active material.

* * * * *